United States Patent
Nguyen et al.

(10) Patent No.: US 11,030,796 B2
(45) Date of Patent: Jun. 8, 2021

(54) INTERFACES AND TECHNIQUES TO RETARGET 2D SCREENCAST VIDEOS INTO 3D TUTORIALS IN VIRTUAL REALITY

(71) Applicant: ADOBE INC., San Jose, CA (US)

(72) Inventors: Cuong Nguyen, San Francisco, CA (US); Stephen Joseph DiVerdi, Oakland, CA (US); Balasaravanan Thoravi Kumaravel, Berkeley, CA (US)

(73) Assignee: ADOBE Inc., San Jose, CA (US)

( * ) Notice: Subject to any disclaimer, the term of this patent is extended or adjusted under 35 U.S.C. 154(b) by 0 days.

(21) Appl. No.: 16/163,428

(22) Filed: Oct. 17, 2018

(65) Prior Publication Data

US 2020/0126291 A1    Apr. 23, 2020

(51) Int. Cl.
  *G06T 19/20*    (2011.01)
  *G06T 15/20*    (2011.01)
  (Continued)

(52) U.S. Cl.
  CPC ............ *G06T 15/205* (2013.01); *G06F 3/011* (2013.01); *G06T 19/003* (2013.01); *G06T 19/20* (2013.01)

(58) Field of Classification Search
  CPC ..... G06T 15/025; G06T 19/003; G06T 19/20; G06F 3/011
  (Continued)

(56) References Cited

U.S. PATENT DOCUMENTS

2003/0005439 A1\*  1/2003  Rovira ............... H04N 21/4314
                                                    725/37
2016/0286208 A1\*  9/2016  Drouin ............... H04N 21/4307
  (Continued)

FOREIGN PATENT DOCUMENTS

WO    WO2018/009427    \*  1/2018    ............. G06T 15/20

OTHER PUBLICATIONS

Corcoran, F.; Demaine, J.; Picard, M.; Dicaire, L.; Taylor, J. Inuit3D: An Interactive Virtual 3D Web Exhibition. In Proceedings of the Conference on Museums and the Web, Boston, MA, USA, Apr. 17-20, 2002.\*

(Continued)

*Primary Examiner* — Jin Ge
(74) *Attorney, Agent, or Firm* — Shook, Hardy & Bacon L.L.P.

(57)    ABSTRACT

Embodiments of the present invention provide systems, methods, and computer storage media which retarget 2D screencast video tutorials into an active VR host application. VR-embedded widgets can render on top of a VR host application environment while the VR host application is active. Thus, VR-embedded widgets can provide various interactive tutorial interfaces directly inside the environment of the VR host application. For example, VR-embedded widgets can present external video content, related information, and corresponding interfaces directly in a VR painting environment, so a user can simultaneously access external video (e.g., screencast video tutorials) and a VR painting. Possible VR-embedded widgets include a VR-embedded video player overlay widget, a perspective thumbnail overlay widget (e.g., a user-view thumbnail overlay, an instructor-view thumbnail overlay, etc.), an awareness overlay widget, a tutorial steps overlay widget, and/or a controller overlay widget, among others.

18 Claims, 11 Drawing Sheets

(51) Int. Cl.
*G06F 3/01* (2006.01)
*G06T 19/00* (2011.01)

(58) Field of Classification Search
USPC .......................................................... 345/427
See application file for complete search history.

(56) References Cited

U.S. PATENT DOCUMENTS

| | | | |
|---|---|---|---|
| 2017/0180780 A1* | 6/2017 | Jeffries | H04N 21/4307 |
| 2017/0354883 A1* | 12/2017 | Benedetto | A63F 13/533 |
| 2018/0095616 A1* | 4/2018 | Valdivia | H04L 51/16 |
| 2018/0113669 A1* | 4/2018 | Szeto | G06F 3/011 |
| 2018/0349283 A1* | 12/2018 | Bhatia | H04N 21/4782 |
| 2019/0012844 A1* | 1/2019 | Rao | G06F 3/011 |
| 2019/0099678 A1* | 4/2019 | Khan | G06T 11/60 |
| 2020/0068002 A1* | 2/2020 | Cheung | H04L 65/4069 |

OTHER PUBLICATIONS

Daniel Vogel, Paul Lubos, Frank Steinicke: AnimationVR—Interactive Controller-Based Animating in Virtual Reality. VR 2018: 781-782.*

T. Grossman, J. Matejka, and G. Fitzmaurice. Chronicle: capture, exploration, and playback of document workflow histories. In Proc. ACM UIST, pp. 143-152, 2010.*

Cuong Nguyen, Stephen DiVerdi, Aaron Hertzmann, and Feng Liu. 2017a. CollaVR: Collaborative In-Headset Review for VR Video. In ACM symposium on User interface software and technology—UIST '17. ACM.*

Pick, S., Weyers, B., Hentschel, B., and Kuhlen, T. W. 2016. Design and Evaluation of Data Annotation Workflows for CAVE-like Virtual Environments. IEEE TVCG 22, 4, 1452-1461.*

Max Krichenbauer, Goshiro Yamamoto, Takafumi Taketomi, Christian Sandor, and Hirokazu Kato. 2014. Towards Augmented Reality user interfaces in 3D media production. In 2014 IEEE International Symposium on Mixed and Augmented Reality (ISMAR). IEEE, 23-28.*

Cuong Nguyen, Stephen DiVerdi, Aaron Hertzmann, and Feng Liu. 2017. Vremiere: In-Headset Virtual Reality Video Editing. In Proceedings of the 2017 CHI Conference on Human Factors in Computing Systems.*

Jacqueline Chu, Chris Bryan, Min Shih, Leonardo Ferrer, and Kwan-Liu Ma. 2017. Navigable Videos for CHI 2018 Paper CHI 2018, Apr. 21-26, 2018, Montreal, QC, Canada Paper 64 p. 7.*

Oculus Dash. (n.d.). Retreived Oct. 2, 2018 from the Oculus PC SDK Developer Guide at <https://developer.oculus.com/documentation/pcsdk/latest/concepts/dg-dash/>. 6 pages.

Medium. (n.d.) Oculus. Retreived Oct. 17, 2018 from the Internet at <https://www.oculus.com/medium/>. 4 pages.

Quill. (n.d.) Oculus. Retreived Oct. 17, 2018 from the Internet at <https://www.oculus.com/experiences/rift/1118609381580656/>. 4 pages.

Anderson, F., Grossman, T., Matejka, J., & Fitzmaurice, G. (Oct. 2013). YouMove: enhancing movement training with an augmented reality mirror. In Proceedings of the 26th annual ACM symposium on User interface software and technology (pp. 311-320). ACM.

Ardouin, J., Lécuyer, A., Marchal, M., & Marchand, E. (Mar. 2011). Design and evaluation of methods to prevent frame cancellation in real-time stereoscopic rendering. In 3D User Interfaces (3DUI), 2011 IEEE Symposium on (pp. 95-98). IEEE.

Arora, R., Kazi, R. H., Anderson, F., Grossman, T., Singh, K., & Fitzmaurice, G. W. (May 2017). Experimental Evaluation of Sketching on Surfaces in VR. In CHI (pp. 5643-5654).

Arora, R., Habib Kazi, R., Grossman, T., Fitzmaurice, G., & Singh, K. (Apr. 2018). SymbiosisSketch: Combining 2D & 3D Sketching for Designing Detailed 3D Objects in Situ. In Proceedings of the 2018 CHI Conference on Human Factors in Computing Systems (p. 185). ACM.

Banovic, N., Grossman, T., Matejka, J., & Fitzmaurice, G. (Oct. 2012). Waken: reverse engineering usage information and interface structure from software videos. In Proceedings of the 25th annual ACM symposium on User interface software and technology (pp. 83-92). ACM.

Barrera Machuca, M. D., Asente, P., Lu, J., Kim, B., & Stuerzlinger, W. (Oct. 2017). Multiplanes: Assisted Freehand VR Drawing. In Adjunct Publication of the 30th Annual ACM Symposium on User Interface Software and Technology (pp. 1-3). ACM.

Cabral, M. C., Morimoto, C. H., & Zuffo, M. K. (Oct. 2005). On the usability of gesture interfaces in virtual reality environments. In Proceedings of the 2005 Latin American conference on Human-computer interaction (pp. 100-108). ACM.

Chi, P. Y., Ahn, S., Ren, A., Dontcheva, M., Li, W., & Hartmann, B. (Oct. 2012). MixT: automatic generation of step-by-step mixed media tutorials. In Proceedings of the 25th annual ACM symposium on User interface software and technology (pp. 93-102). ACM.

Constine, J. (2015). Oculus "Quill" Turns VR Painting Into Performance Art. TechCrunch. Retreived from the Internet Oct. 17, 2018 from <https://techcrunch.com/2016/01/26/oculus-quill/>. 6 pages.

Damen, D., Leelasawassuk, T., Haines, O., Calway, A., & Mayol-Cuevas, W. W. (Sep. 2014). You-Do, I-Learn: Discovering Task Relevant Objects and their Modes of Interaction from Multi-User Egocentric Video. In BMVC (vol. 2, p. 3).

Deering, M. F. (1995). HoloSketch: a virtual reality sketching/animation tool. ACM Transactions on Computer-Human Interaction (TOCHI), 2(3), 220-238.

Denning, J. D., Kerr, W. B., & Pellacini, F. (Aug. 2011). Meshflow: interactive visualization of mesh construction sequences. In ACM Transactions on Graphics (TOG) (vol. 30, No. 4, p. 66). ACM.

Goto, M., Uematsu, Y., Saito, H., Senda, S., & Iketani, A. (Oct. 2010). Task support system by displaying instructional video onto AR workspace. In Mixed and Augmented Reality (ISMAR), 2010 9th IEEE International Symposium on (pp. 83-90). IEEE.

Grabler, F., Agrawala, M., Li, W., Dontcheva, M., & Igarashi, T. (Jul. 2009). Generating photo manipulation tutorials by demonstration. In ACM Transactions on Graphics (TOG) (vol. 28, No. 3, p. 66). ACM.

Grossman, T., & Fitzmaurice, G. (Apr. 2010). ToolClips: an investigation of contextual video assistance for functionality understanding. In Proceedings of the SIGCHI Conference on Human Factors in Computing Systems (pp. 1515-1524). ACM.

Grossman, T., Matejka, J., & Fitzmaurice, G. (Oct. 2010). Chronicle: capture, exploration, and playback of document workflow histories. In Proceedings of the 23nd annual ACM symposium on User interface software and technology (pp. 143-152). ACM.

Hu, H. H., Gooch, A. A., Thompson, W. B., Smits, B. E., Rieser, J. J., & Shirley, P. (Oct. 2000). Visual cues for imminent object contact in realistic virtual environment. In Proceedings of the conference on Visualization'00 (pp. 179-185). IEEE Computer Society Press.

Matejka, J., Grossman, T., & Fitzmaurice, G. (May 2011). Ambient help. In Proceedings of the SIGCHI Conference on Human Factors in Computing Systems (pp. 2751-2760). ACM.

Mohr, P., Mandl, D., Tatzgern, M., Veas, E., Schmalstieg, D., & Kalkofen, D. (May 2017). Retargeting Video Tutorials Showing Tools With Surface Contact to Augmented Reality. In Proceedings of the 2017 CHI Conference on Human Factors in Computing Systems (pp. 6547-6558). ACM.

Myers, B. A., Bhatnagar, R., Nichols, J., Peck, C. H., Kong, D., Miller, R., & Long, A. C. (Apr. 2002). Interacting at a distance: measuring the performance of laser pointers and other devices. In Proceedings of the SIGCHI conference on Human factors in computing systems (pp. 33-40). ACM.

Mysore, A., & Guo, P. J. (Oct. 2017). Torta: Generating Mixed-Media GUI and Command-Line App Tutorials Using Operating-System-Wide Activity Tracing. In Proceedings of the 30th Annual ACM Symposium on User Interface Software and Technology (pp. 703-714). ACM.

Nakamura, T., & Igarashi, T. (Oct. 2008). An application-independent system for visualizing user operation history. In Proceedings of the 21st annual ACM symposium on User interface software and technology (pp. 23-32). ACM.

(56) References Cited

OTHER PUBLICATIONS

Nguyen, C., & Liu, F. (Apr. 2015). Making software tutorial video responsive. In Proceedings of the 33rd Annual ACM Conference on Human Factors in Computing Systems (pp. 1565-1568). ACM.

Petersen, N., & Stricker, D. (Nov. 2012). Learning task structure from video examples for workflow tracking and authoring. In Mixed and Augmented Reality (ISMAR), 2012 IEEE International Symposium on (pp. 237-246). IEEE. Abstract Only. 1 page.

Plaisant, C., Rose, A., Rubloff, G., Salter, R., & Shneiderman, B. (Dec. 1999). The design of history mechanisms and their use in collaborative educational simulations. In Proceedings of the 1999 conference on Computer support for collaborative learning (p. 44). International Society of the Learning Sciences.

Pongnumkul, S., Dontcheva, M., Li, W., Wang, J., Bourdev, L., Avidan, S., & Cohen, M. F. (Oct. 2011). Pause-and-play: automatically linking screencast video tutorials with applications. In Proceedings of the 24th annual ACM symposium on User interface software and technology (pp. 135-144). ACM.

Reichelt, S., Häussler, R., Fütterer, G., & Leister, N. (May 2010). Depth cues in human visual perception and their realization in 3D displays. In Three-Dimensional Imaging, Visualization, and Display 2010 and Display Technologies and Applications for Defense, Security, and Avionics IV (vol. 7690, p. 76900B). International Society for Optics and Photonics.

Schkolne, S., Pruett, M., & Schröder, P. (Mar. 2001). Surface drawing: creating organic 3D shapes with the hand and tangible tools. In Proceedings of the SIGCHI conference on Human factors in computing systems (pp. 261-268). ACM.

Sodhi, R., Benko, H., & Wilson, A. (May 2012). LightGuide: projected visualizations for hand movement guidance. In Proceedings of the SIGCHI Conference on Human Factors in Computing Systems (pp. 179-188). ACM.

Sun, G., & Holliman, N. (Feb. 2009). Evaluating methods for controlling depth perception in stereoscopic cinematography. In Stereoscopic Displays and Applications XX (vol. 7237, p. 72370I). International Society for Optics and Photonics.

Terzić, K., & Hansard, M. (2016). Methods for reducing visual discomfort in stereoscopic 3D: A review. Signal Processing: Image Communication, 47, 402-416.

Wesche, G., & Seidel, H. P. (Nov. 2001). FreeDrawer: a free-form sketching system on the responsive workbench. In Proceedings of the ACM symposium on Virtual reality software and technology (pp. 167-174). ACM.

White, S., Lister, L., & Feiner, S. (Nov. 2007). Visual hints for tangible gestures in augmented reality. In Proceedings of the 2007 6th IEEE and ACM International Symposium on Mixed and Augmented Reality (pp. 1-4). IEEE Computer Society.

Wiese, E., Israel, J. H., Meyer, A., & Bongartz, S. (Jun. 2010). Investigating the learnability of immersive free-hand sketching. In Proceedings of the Seventh Sketch-Based Interfaces and Modeling Symposium (pp. 135-142). Eurographics Association.

Yang, U., & Kim, G. J. (2002). Implementation and evaluation of "just follow me": an immersive, VR-based, motion-training system. Presence: Teleoperators & Virtual Environments, 11(3), 304-323.

Fernquist, J., Grossman, T., & Fitzmaurice, G. (Oct. 2011). Sketch-sketch revolution: an engaging tutorial system for guided sketching and application learning. In Proceedings of the 24th annual ACM symposium on User interface software and technology (pp. 373-382). ACM.

\* cited by examiner ial expression. Generally, VR design relies on the

INTERFACES AND TECHNIQUES TO RETARGET 2D SCREENCAST VIDEOS INTO 3D TUTORIALS IN VIRTUAL REALITY

BACKGROUND

Various Virtual Reality (VR) design techniques such as painting, sketching, and sculpting in VR are emerging forms of artistic expression. Generally, VR design relies on the ability to move a hand in mid-air to directly manipulate and create 3D shapes. This what-you-see-is-what-you-get paradigm was foreseen by early research, and yet has only recently become widely available due to advancements in VR optics and spatial tracking technologies. The freedom of expression in VR is perhaps one of the main reasons VR design has received significant interest from creative communities.

There is a growing interest among the creative community to explore and learn new techniques in VR painting, for example. Currently, most users learn using community posted 2D-videos on the internet. The most common form of knowledge sharing among VR creatives today is the use of 2D screencast videos that capture an instructor recording of a VR painting process.

SUMMARY

Embodiments of the present invention are directed to retargeting an external video, such as a screencast video, into a VR host application environment. At a high level, one or more VR-embedded widgets can be rendered on top of a VR environment for an active VR host application. To accomplish this, the rendering and event system of the VR host application can be injected into code for a VR-embedded widget to facilitate rendering the widget on top of the VR host application, and responsive to a user's VR inputs. As such, various VR-embedded widgets can provide interactive tutorial interfaces directly inside the environment of the VR host application.

In some embodiments, a VR-embedded video retargeting system can accept as inputs a 2D video, such as a screencast video (e.g., captured from both eyes of an instructor), and corresponding log data comprising a 3D drawing and activity traces of a VR device used in the 2D screencast video tutorial to generate the 3D drawing. The log data can include timestamped controller poses (e.g., position and orientation), head-mounted display (HMD) poses, button presses, and/or traces derived therefrom such as fine-grained brush and color data. The VR-embedded widgets can use the log data to deliver more effective 3D instructions for an associated 2D video and enhance a user's ability to understand controller interactions and 3D information depicted in the 2D video. The VR-embedded widgets can include a VR-embedded video player overlay widget, a perspective thumbnail overlay widget (e.g., a user-view thumbnail overlay, an instructor-view thumbnail overlay, etc.), an awareness overlay widget, a tutorial steps overlay widget, and/or a controller overlay widget, among others.

In some embodiments, a video player overlay widget can be rendered on top of a VR application environment and configured to playback external video content. Designated events (e.g., author annotations, automatically detected events, etc.) can be represented on corresponding portions of a video timeline on the video player overlay widget. Various types of events may be automatically detected by analyzing the video and/or corresponding log data. In some embodiments, the beginning and ending of tutorial steps can be identified from gaps in space and/or time in log data (e.g., gaps between clusters of 3D strokes). Different events (e.g., designated important events, tool/mode changes, step transitions, detected events, etc.) may be depicted on the video timeline as different icons. Such icons not only provide navigation cues, but also provide temporal awareness of the corresponding events (e.g., events emphasized by the author).

Additionally or alternatively, one or more perspective thumbnail overlay widgets can render a 3D controller simulation scene associated with a video tutorial of VR (e.g., a screencast video) and/or a corresponding 3D drawing. The 3D controller simulation scene can illustrate in 3D the actions of, and interactions with, an instructor's controller from a 2D video in order to help users better understand stroke structure and controller interactions. Log data associated with a 2D video (e.g., such as a 3D drawing, HMD and controller 3D positions and orientations, controller button press events, and the like) can be used to generate and animate the 3D controller simulation scene from different perspectives. A perspective thumbnail overlay widget that presents a simulation from the perspective of the viewer is called a user-view overlay widget. Similarly, a perspective thumbnail overlay widget that presents a simulation from the perspective of the instructor is called an instructor-view overlay widget.

In some embodiments, an awareness overlay widget may be provided as an extension of the video player overlay widget. When a user looks away from a video playing in the video player overlay widget, an awareness overlay widget can appear. The awareness overlay widget may provide the user with abbreviated information about the video, such as visual information about the progress of the video and/or various events from the video.

These and other VR-embedded widgets are contemplated within the scope of the present disclosure. Using implementations described herein, a user can efficiently and effectively view 2D videos, such as screencast videos and related information, as tutorials inside a VR host application.

BRIEF DESCRIPTION OF THE DRAWINGS

The present invention is described in detail below with reference to the attached drawing figures, wherein.

DETAILED DESCRIPTION

Overview

Figure 1:
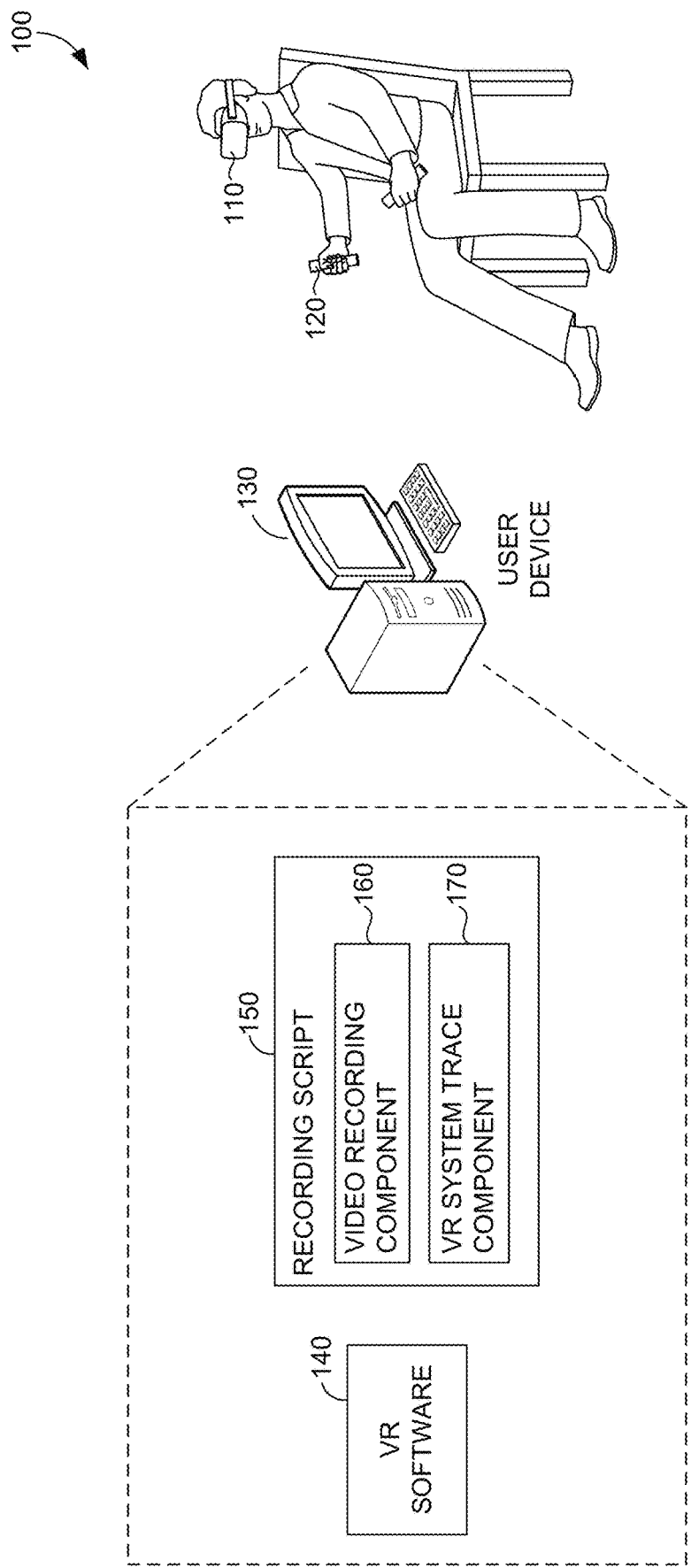
FIG. 1 is a block diagram of an example VR system for recording 2D screencast videos such as tutorials, in accordance with embodiments of the present invention.

VR design is a creative process and requires mastery of two predominant skills: VR user interface (UI) skills (e.g., how to use interface elements such as 3D menus or tools) and VR artistic skills (e.g., what are the creative techniques available). Currently, learning VR design happens mainly through trial and error. Support for VR design tutorials has been limited. Most VR applications only provide onboarding experiences that focus on basic functions. More importantly, users do not have a convenient way in VR to browse and consume tutorials that have been created by other users.

Video is prevalent in online VR user communities and on VR applications' learning pages. Its apparent benefit is the low overhead cost of authoring: a user only needs to hit the "record" button once to capture. Other users can then view this capture and learn about the author's design process in VR. This type of learning is self-paced, holistic, and may encourage metacognitive processes. Additionally, screencast video is also application-agnostic—the user does not need to rely on the VR application to provide dedicated APIs for recording. This means that any user can create and share tutorials for any VR applications, techniques, and features.

However, there are inherent limitations to using 2D videos as tutorials in VR, including integration and interpretability problems. First, traditional video players are not well-integrated into VR design applications. To view a video in VR, a user must first play the video on a 2D screen such as desktop computer monitor. Then, the user must pause the video, put on a VR head-mounted display (HMD) and switch to a VR application, and apply in VR what she just learned. The user may forget details and, in many cases, may need to take off the HMD to watch the video again on the desktop computer. This process of repetitively switching between 2D and 3D is inconvenient, time-consuming, and impedes learning.

Furthermore, 2D screencast videos cannot optimally convey VR design instructions, such as instructions showing users how to trigger a tool, perform a paint stroke, or execute an action in VR. The spatial nature of 3D VR tasks can be difficult to interpret from a 2D video because they require observing intricate gestures from the VR's six degrees of freedom (6 DOF) controllers and the HMD. Compared with more familiar and comprehensible 2D interfaces like those provided by standard desktop software, carrying out tasks in VR spaces involves interaction in a much more complex 3D input space and with new and unfamiliar interface concepts and interaction designs (e.g., teleportation, 3D color picking, and so on). Moreover, many 2D video instructions depict 3D controller movements, which are also very difficult to interpret from a 2D recording. Generally, while 2D video tutorials may suffice for teaching 2D-software tools, these videos by themselves often fail to effectively communicate 3D detail required to understand actions in VR space.

Currently, only limited solutions exist for users to access 2D video tutorials, such as 2D screencasts, while in VR. The most common way is for the user to switch between VR and watching the video on a desktop computer. A user can also open a video application in VR, but that would require pausing the current VR painting application. Both of these approaches disrupt the user's flow of learning and painting.

Current VR painting applications often provide in-app tutorials that teach users the basics such as opening a tool or completing a basic painting. However, this form of tutorial is application-specific. For example, these in-app tutorials can only be viewed in the host application, and the host application can only view in-app content. More specifically, these VR apps do not include a video player that can load external 2D video tutorials, such as 2D screencast videos, within their VR application environments. Furthermore, proprietary applications often do not provide access to application APIs, preventing tutorial creators from accessing raw recordings of a user workflow that can reduce authoring overhead.

One VR application allows a user to overlay application windows in a VR environment. Using this application, users can overlay a 2D video player over another VR application, such as a VR painting app. However, in order to interact with one of the applications in the VR environment, the other application must be paused. For example, a user must pause the VR painting app in order to interact with the 2D video. As such, users will often need to switch between applications, which can be inconvenient, time-consuming, and impedes learning.

Finally, some VR/AR systems include tutorials that teach users to harness spatial tracking and feedback to learn basic motor tasks. For example, some AR systems use video to teach procedural tasks such as machine assembly or path tracing. However, motor skill is only a subset of VR design workflows. As such, these systems fail to instruct the full scope of VR design workflows, including tool usage, task demonstration, and content progression.

Some problems with 2D videos of VR tutorials have not been adequately addressed, if at all, by prior techniques. For example, some users tend to experience difficulty understanding 3D interactions with VR controllers from a 2D video. Generally, a VR controller is often the primary input device for many VR applications. In situations where a user experiences difficulty understanding how to perform a low-level action depicted in a video tutorial, users tend to look at the VR controller in the video to figure out what action has been performed. However, this technique is not always feasible due to various reasons. For example, the instructor's controllers may not be in the instructor's field of view while recording, in which case the controllers will be not present in the video. Furthermore, button presses on controllers can be too quick to notice, even when presented in a video. Viewing quick button presses often requires users to navigate to the precise frame in which the button was pressed in order to identify the interaction from the video. Moreover, users tend to experience difficulty understanding a coordination of consecutive button presses and hand gestures. For example, a multi-step action such as moving a selected object by touching the object, holding down a button on the controller, and then moving the selected object by moving a controller can be difficult to discern from a 2D video. Generally, it can be easy to miss the timing of at least one of a series of multi-step action actions.

At least three sources can lead to this interaction problem while viewing video tutorials to learn VR design tasks. First, learning to perform actions in a VR environment requires users to learn an unfamiliar button-action mapping. Since interactions in VR are not standardized, there is no preconceived and established notion of what actions should be mapped to VR controller buttons, how the buttons work, and what purpose they serve. This is in contrast to 2D controllers like a mouse where clicking and dragging type interactions are well standardized. Second, 2D videos often do not show all the controller interactions performed by an instructor to achieve a particular output. Third, interactions with a 3D space occurs using two 6 DoF tracked controllers. This opens up a richer input space with multiple interactions that need to occur in tandem with button presses, which may not be conveyed effectively in a video, depending on the viewpoint of the instructor.

Furthermore, some users tend to experience difficulty perceiving relative depth between controllers and elements of a VR painting environment from a 2D video of a VR tutorial. This limitation can prevent users from answering questions like, "How far away from an object should I draw something?", "Is the instructor's controller touching an artifact or not?", "Is an instructor's stroke an ellipse or a circle?", and the like. In a particular selection task where an instructor selects an artifact of a 3D painting using a combination of contacting the artifact and pressing a button on a controller, 2D video often fails to convey the understanding that the controller needs to be in contact with the artifact.

Moreover, users tend to experience difficulty understanding 3D motion of an instructor's hand gestures from a 2D video of a VR tutorial. When presented with an action involving the creation of a complex stroke, users often experience difficulty replicating the stroke, and instead choose to create their own version that looks visually similar to that seen from the viewpoint of the instructor. However, there is no way to compare the resulting stroke with that drawn in a 2D video from different perspectives. Moreover, the creation of such strokes can occur very quickly, and such strikes are often occluded by themselves or by other elements in a VR painting environment. These occlusions in 2D videos prevent users from obtaining a complete awareness of the complexity of the stroke, which leads users to misunderstand stroke structure and draw strokes in an incorrect manner.

These problems can be traced back to the fact that such videos are inherently 2D, and information related to depth and perspective is often imperceptible without explicit instructor elicitation or cues like lighting, shadows and occlusion. However, in many VR paintings and VR painting applications, some or all of these cues are unavailable, and explicit elicitation by instructors is often absent due to the screencast nature of these recordings.

Finally, some users may miss important events in a 2D video of a VR tutorial, such as a tool selection or mode changes. This problem can occur for various reasons. For example, users may look away from the video player while carrying out their actions, thereby missing important visual instructions when the instructor did not explicitly voice out an important step. Further, painting is an immersive experience. As such, users may miss an important step while a video plays. Finally, due to the lack of an adequate tutorial navigation mechanism, users may skip important steps while seeking in a video.

Various techniques are described which integrate and adapt 2D videos, such as screencast videos, into tutorials inside a VR host application. To this end, a VR-embedded video retargeting system can be provided with one or more VR-embedded widgets. In some embodiments, a VR host application's rendering and event system can be injected into code for a VR-embedded video widget to facilitate rendering the widget on top of the VR host application, and responsive to a user's VR inputs. As such, VR-embedded widgets can provide various interactive tutorial interfaces directly inside the environment of the VR host application. The VR-embedded video retargeting system can accept as inputs a 2D video, such as a screencast video (e.g., captured from both eyes of an instructor), and corresponding log data comprising a 3D drawing and activity traces of one or more VR devices used in the 2D screencast video tutorial to generate the 3D drawing. The log data can include timestamped controller poses (e.g., position and orientation), head-mounted display (HMD) poses, button presses, and/or traces derived therefrom such as fine-grained brush and color data.

As explained in more detail below, the VR-embedded widgets can use the log data to deliver more effective 3D instructions for an associated 2D video. The log data can be captured while recording a video, and can be synchronized with the video, whether at the time of capture or some time thereafter. Generally, the VR-embedded widgets can use the log data to present additional 3D information about an associated 2D video to enhance a user's ability to understand controller interactions and 3D information depicted in the 2D video. The VR-embedded widgets can include a VR-embedded video player overlay widget, a perspective thumbnail overlay widget (e.g., a user-view thumbnail overlay, an instructor-view thumbnail overlay, etc.), an awareness overlay widget, a tutorial steps overlay widget, and/or a controller overlay widget, among others.

Generally, VR-embedded widgets can be rendered directly inside an active VR application environment (e.g., for a VR painting application). In this manner, the user can access external tutorial content (e.g., screencast video tutorials) while interacting with the VR application (e.g., while painting). Further, the user can interact with the VR-embedded widgets to explore and learn at the user's own pace. For example, VR-embedded widgets can present external video content, related information, and corresponding interfaces directly in a VR painting environment, so a user can simultaneously access video content (e.g., screencast video tutorials) and a VR painting. More specifically, VR-embedded widgets can inject a VR application's rendering and event system so that the widgets can be rendered on top of the VR application and can be programmed to respond to a user's input in VR.

For example, a VR-embedded video player can be provided as an overlay on top of a VR application environment. In order to facilitate an experience that integrates a VR application environment (e.g., a VR painting application environment) with the process of watching and interacting with external videos, a video player overlay widget can be embedded within a VR application environment. Various UI elements can be provided to enable a user to customize the position and size of the widget, and/or to assist in navigating the timeline. In some embodiments, a stereo mode may be toggled, and the video player overlay widget can present a stereo-captured version of the video, when available.

Designated events (e.g., author annotations, automatically detected events, etc.) can be represented on corresponding portions of a video timeline on the video player overlay widget. Various types of events may be automatically detected by analyzing the video and/or corresponding log data. For example, a video analysis or analysis of log data may be performed to identify spurious HMD motion, ambiguous controller movement in the z direction, and/or fast or hidden button presses. In some embodiments, the beginning and ending of tutorial steps can be identified from gaps in space and/or time in log data (e.g., gaps between clusters of 3D strokes). Different events (e.g., designated important events, tool/mode changes, step transitions, detected events, etc.) may be depicted on the video timeline as different icons. Such icons not only provide navigation cues, but also provide temporal awareness of the corresponding events (e.g., events emphasized by the author).

In some embodiments, one or more perspective thumbnail overlay widgets can render a 3D controller simulation scene associated with a video tutorial of VR (e.g., a screencast video) and/or a corresponding 3D drawing. The 3D controller simulation scene can illustrate in 3D the actions of, and interactions with, an instructor's controller from a 2D video in order to help users better understand stroke structure and controller interactions. Log data associated with a 2D video (e.g., such as a 3D drawing, HMD and controller 3D positions and orientations, controller button press events, and the like) can be used to generate and animate the 3D controller simulation scene from different perspectives. A perspective thumbnail overlay widget that presents a simulation from the perspective of the viewer is called a user-view overlay widget. Similarly, a perspective thumbnail overlay widget that presents a simulation from the perspective of the instructor is called an instructor-view overlay widget.

Use of a perspective thumbnail overlay widget offers various advantages in teaching aspects of a VR design process. For example, a perspective thumbnail overlay widget can allow users to view and explore the stroke creation process from different perspectives, free of occlusion by other elements. In some embodiments, the user can switch to different perspectives using the zoom/rotate sliders present in the widget, and the widget may snap back to the original viewpoint after releasing a slider. In another example, when a button is pressed on a controller in a video, the corresponding button can be highlighted on a virtual controller. Being able to see what is being pressed and how the controller is moving can help users better understand the spatio-temporal relationship of complex controller interactions.

In some embodiments, a user can reach into the thumbnail in the perspective thumbnail overlay widget and brush over a 3D painting depicted in the thumbnail to trigger a search for corresponding video segments showing how to paint that region, and the video player overlay widget can automatically navigate to a corresponding portion of the video. Additionally or alternatively, a feedback mode can be toggled that allows users to practice complicated 3D strokes. A difference function between an instructor-generated stroke (e.g., from log data) and a user-generated stroke can be used to present a visualization illustrating how close the user-generated stroke appears. The visualization can take various forms, such as a numerical score, a 3D visualization of a spatial distribution of the difference function, and the like.

In some embodiments, an awareness overlay widget may be provided as an extension of the video player overlay widget. When a user looks away from a video playing in the video player overlay widget, an awareness overlay widget can appear. The awareness overlay widget may provide the user with abbreviated information about the video, such as visual information about the progress of the video and/or various events from the video. For example, in the context of a screencast video tutorial, the visual information may include a video thumbnail, current video time, and/or icons representing events and their temporal location on a video timeline. As the video plays, the positions of the icons can advance along the timeline. As with the video player overlay widget, the size of the icons presented on the awareness overlay widget may increase temporarily as the corresponding event approaches the current video time to aid in attracting user attention. As with the video player overlay widget, in some embodiments, a user may quickly navigate to an event by clicking on its icons in the awareness overlay widget.

As such, using implementations described herein, a user can efficiently and effectively view 2D videos, such as screencast videos, as tutorials inside a VR host application. A VR-embedded video retargeting system for VR design can accept as inputs a screencast video and log data comprising a 3D drawing and activity traces of a VR device used in the 2D video to generate the 3D drawing. In some embodiments, the VR-embedded video retargeting system may include various tools that can increase the utility of screencast video as a VR tutorial. These tools enhance UI accessibility, spatio-temporal exploration, depth perception and/or instruction awareness. For example, depth perception can be enhanced by rendering a screencast video stereoscopically (e.g., in a video player overlay widget), and supplementing it with a simulated 3D rendering of corresponding virtual controllers and 3D painting strokes from the screencast video (e.g., in a perspective thumbnail overlay widget). Further, perspective perception can be enhanced by presenting widgets that allow users to view the stroke creation process in the screencast video from different perspectives (e.g., the user's perspective, the author's perspective, a tunable perspective, etc.). Controller interactions in a screencast video can be emphasized by highlighting them for an extended duration, thereby giving users additional time to understand quick actions occurring in a screencast video. Instructional awareness can be enhanced using a widget that follows the user's field of view and presents a quick-view of information about the screencast video (e.g., in an awareness overview widget). Accordingly, the VR-embedded video retargeting system and its constituent VR-embedded widgets facilitate a more optimal learning experience over prior techniques.

Having briefly described an overview of aspects of the present invention, various terms used throughout this description are provided. Although more details regarding various terms are provided throughout this description, general descriptions of some terms are included below to provider a clearer understanding of the ideas disclosed herein:

A screencast video, as used herein, refers to a recording of a computer screen output, often including an audio recording of narration. In the context of VR design applications such as VR painting, desktop software can mirror a user's view of a VR application environment from a VR headset onto a 2D computer monitor. Instructors can generate 2D screencast video tutorials by recording the mirrored video feed, along with voice-over commentary and instructions, as they perform actions in VR.

Log data, as used herein, refers to a 3D drawing and/or one or more activity traces of a VR device (such as a controller or headset) used to generate the 3D drawing. For example, log data can include timestamped controller poses (e.g., position and orientation), head-mounted display (HMD) poses, button presses, and/or traces derived therefrom such as fine-grained brush and color data. Log data can be captured while recording a screencast video, and can be stored in any suitable format and/or file structure (and in any number of files). Generally, various VR-embedded widgets can use log data to present additional information about an associated 2D video to enhance a user's ability to understand controller interactions and 3D information depicted in the 2D video.

VR-embedded widgets, as used herein, refer to GUI elements in VR that render on top of a host application in VR. For example, a VR host application's rendering and event system can be injected into code for a VR-embedded widget to facilitate rendering the widget on top of the VR host application, and responsive to a user's VR inputs. A VR-embedded widget can intercept a user's VR inputs that interact with interaction elements (e.g., buttons, sliders, scroll bars, etc.) of the widget, and the VR-embedded widget can perform corresponding functions while the VR host application is active. For example, a video player overlay widget, as used herein, refers to a VR-embedded widget that includes a video player configured to play external videos such as screencast videos.

A perspective thumbnail overlay widget, as used herein, refers to a VR-embedded widget that renders a 3D controller simulation scene associated with a video tutorial of VR (e.g., a screencast video) and/or a corresponding 3D drawing. The 3D controller simulation scene can illustrate in 3D the actions of, and interactions with, an instructor's controller from a 2D video in order to help users better understand stroke structure and controller interactions. A perspective thumbnail overlay widget that presents a simulation from the perspective of the viewer is called a user-view overlay widget. Similarly, a perspective thumbnail overlay widget that presents a simulation from the perspective of the instructor is called an instructor-view overlay widget.

An awareness overlay widget, as used herein, refers to a VR-embedded widget that includes a panel that presents abbreviated information about the video, such as visual information about the progress of the video and/or various events from the video. In some embodiments, the awareness overlay widget operates as an extension of the video player overlay widget such that, when a user looks away from a video playing in the video player overlay widget, the awareness overlay widget can appear. In some embodiments, the video player overlay widget is world-fixed, while the awareness overlay widget is view-fixed.

View-fixed, as used herein, refers to a VR element being attached to a user's viewing direction. As a user changes the orientation of her view, a view-fixed element remains in a fixed position in the user's field of view and appears to move relative to the background VR environment.

World-fixed, as used herein, refers to a VR element being attached to a particular position in a VR environment. As a user changes the orientation of her view, a world-fixed element remains in a fixed position in the VR environment and appears to move relative to the user's field of view.
Example VR Environments
VR Screencast Video Recording Referring now to FIG. 1, an example VR system suitable for use in implementing embodiments of the invention is shown. Generally, VR system 100 is suitable for VR video recording, and, among other things, facilitates recording video tutorials such as screencast videos of VR. VR system 100 includes VR display 110 (e.g., a head-mounted display), VR controllers 120 and user device 130. User device 130 can be any kind of computing device capable of facilitating VR video recording. For example, in an embodiment, user device 130 can be a computing device such as computing device 1100, as described below with reference to FIG. 11. In embodiments, user device 130 can be a personal computer (PC), a gaming console, a laptop computer, a workstation, a mobile computing device, a PDA, a cell phone, or the like. Moreover, although VR display 110 and user device 130 are depicted as separate components, this need not be the case. For example, VR display 110 and user device 130 can operate as one standalone VR headset. In some embodiments, VR system 100 includes one or more tracking components (not depicted) for tracking controller and/or user movement (e.g., sensors such as cameras, accelerometers, gyroscopes, etc.). Generally, the components of VR system 100 are communicatively coupled to one another, for example, using one or more wired and/or wireless protocols (e.g., HDMI, USB, WiFi, Bluetooth, etc.). Variations of VR system configurations will be understood by a person of ordinary skill in the art and can be implemented within the present disclosure.

Generally, VR system 100 includes VR software (e.g., system software, middleware, application software, etc.) configured to perform various VR system operations, such as rendering a VR environment for display on VR display 110, mirroring a user's view of the VR environment onto user device 130, detecting various VR gestures made using VR controllers 120 (e.g., button presses, positions, orientations, etc.), and the like. For example, VR software can reside on (e.g., operations can be performed using) user device 130, VR display 110, VR controllers 120, some other component(s), or any combination thereof. For example, user device 130 can include VR software (e.g., VR software 140) configured to receive a video feed mirroring a user's view of a VR environment (e.g., via a software API). Likewise, user device 130 can include VR software (e.g., recording script 150) configured to access activity traces for VR display 110 and VR controllers 120 (e.g., provided by VR display 110 and controllers 120, detected using one or more tracking or other components, some combination thereof, etc.).

In some embodiments, user device 130 includes recording script 150. Recording script 150 may be incorporated, or integrated, into an application or an add-on or plug-in to an application (e.g., a VR mirroring application, VR software developed for VR headsets, etc.). The application, or recording script 150 itself, may be a stand-alone application, a mobile application, a web application, or the like. In some implementations, the application and/or recording script 150 comprises a web application, which can run in a web browser, and could be hosted at least partially server-side. In addition, or instead, the application and/or recording script 150 can comprise a dedicated application. In some cases, the application and/or recording script 150 can be integrated into the operating system (e.g., as a service). Although the recording script 150 may be associated with an application, in some cases, recording script 150, or a portion thereof, can be additionally or alternatively integrated into the operating system (e.g., as a service) or a server (e.g., a remote server). Although recording script 150 is depicted as residing on user device 130, this need not be the case.

In the embodiment illustrated in FIG. 1, recording script 150 includes video recording component 160 and VR system trace component 170. In operation, a VR application running on VR display 110 can communicate with VR software 140 to mirror what the user sees in VR into a desktop window associated with user device 130 as a video stream. Recording script 150 can access the mirrored video stream, an audio feed with voice-over narration from a microphone input (not depicted in FIG. 1), and activity traces for VR display 110 and VR controllers 120. More specifically, video recording component 160 can access the mirrored video stream and audio feed, and combine the two into a screencast video. In some embodiments, video recording component 160 can capture a stereo recording (e.g., left and right views) of a user's VR environment to enable stereo playback in the video player overlay widget, as explained in more detail below.

VR system trace component 170 can access activity traces for VR display 110 and VR controllers 120, such as time-stamped controller poses (e.g., position and orientation), head-mounted display (HMD) poses, button presses, and the like. In some embodiments, VR system trace component 170 can derive traces, and/or access traces derived, from one or more activity traces, such as fine-grained brush and color data. VR system trace component 170 can save these traces (or some portion thereof) as log data, and store the log data in any suitable format and/or file structure (and in any number of files). The log data can be synchronized with the screencast video, whether at the time of capture (e.g., by recording script 150) or some time thereafter (e.g., post-processing, on demand, etc.). The screencast video and associated log data can be stored, transferred, uploaded, downloaded, etc., for later playback on any device.

Additionally or alternatively to providing the screencast video and associated log data for later playback, in some embodiments, recording script 150 (or some other component) can stream the screencast video and associated log data to another device, such as a VR headset, for real-time playback. In this sense, recording script 150, and the VR-embedded widgets described in more detail below, can act as a bridge (unidirectional, bidirectional, multidirectional) for people to communicate within VR. As such, in these embodiments, an instructor can stream a screencast video of the instructor's VR environment to one or more VR-embedded widgets in another user's VR environment, and vice versa. Furthermore, because log data may also streamed, two or more users can exchange instructions at the interaction level. For example, an instructor can demonstrate how a stroke is drawn, she can hold and guide the student's controller, she can point to specific buttons on the student's controller, and the like. More generally, live streams can be viewed by any number of devices, and any type of device. For example, a person outside of VR (e.g., using a desktop computer) can also use the same functionalities to communicate with a VR user. By way of nonlimiting example, during a VR application demo at a trade show, a company representative can use an interface on a desktop computer to stream video and/or log data into one or more VR-embedded widgets as a way to teach attendees how to use VR software.

In some embodiments, an instructor (or some other user) can provide annotations (e.g., in an XML file) to identify certain points in time that designate or emphasize corresponding events and/or segments in a recording. Various events may be designated, such as events deemed important that users should pay attention to, tool/mode changes, and step transitions. Additionally or alternatively, events may be detected and corresponding annotations can be automatically generated, as described in more detail below.

VR-Embedded Video Retargeting

Figure 2:
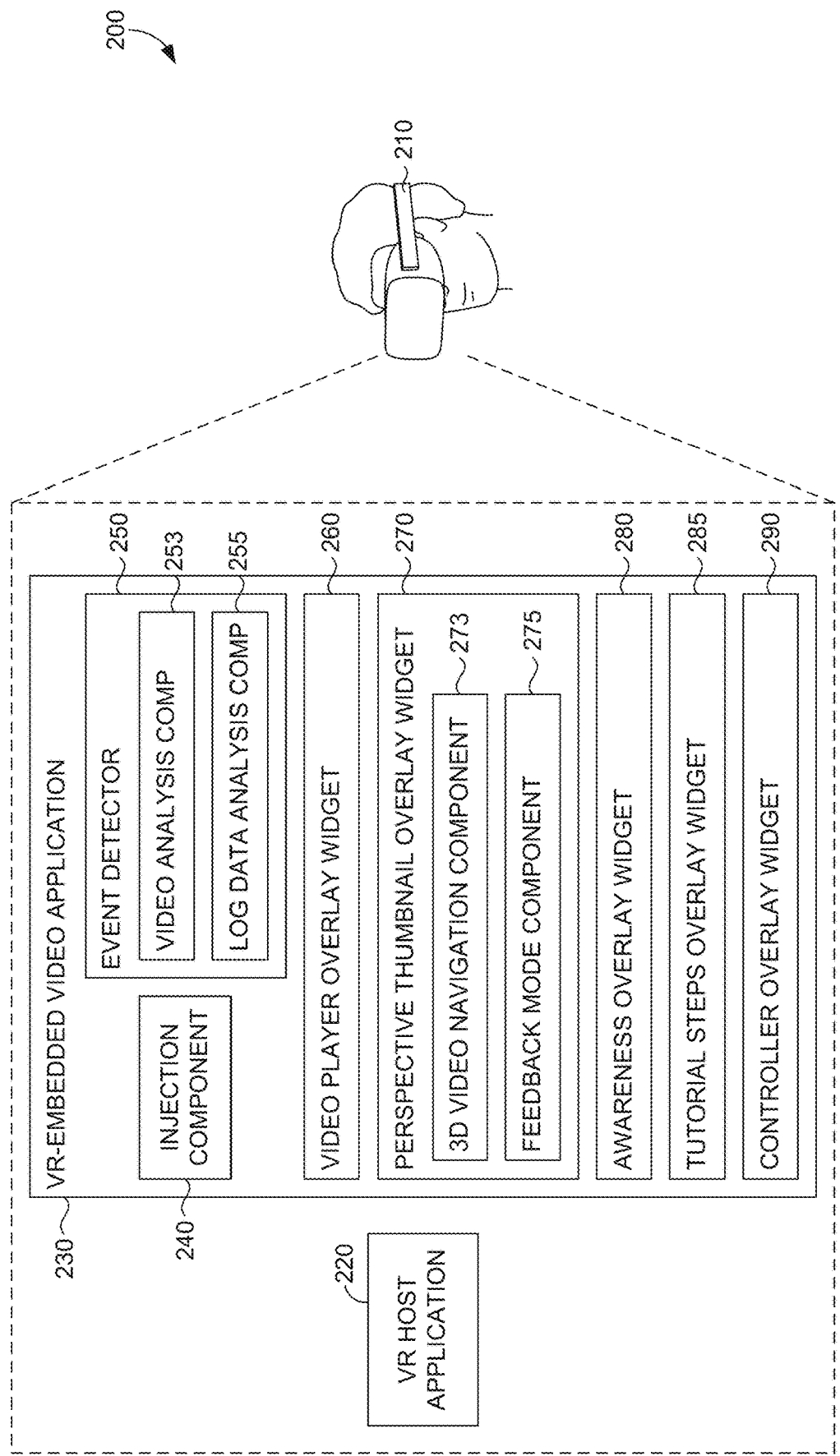
FIG. 2 is a block diagram of an example VR-embedded video retargeting system, in accordance with embodiments of the present invention.

Turning now to FIG. 2, FIG. 2 depicts example VR-embedded video retargeting system 200. VR-embedded video retargeting system 200 includes VR display 210 and VR controllers (not illustrated in FIG. 2). VR display 210 can be any kind of computing device capable of rendering and/or displaying 3D graphics. For example, in some embodiments, VR display 210 can be a head-mounted display, such as OCULUS RIFT®, HTC VIVE®, and PLAYSTATION VR®. In some embodiments, VR display 210 can be a computing device, such as computing device 1100, as described below with reference to FIG. 11. In embodiments, VR display 210 can be a personal computer (PC), a gaming console, a laptop computer, a workstation, a mobile computing device, a PDA, a cell phone, or the like.

Generally, VR-embedded video retargeting system 200 includes VR software (e.g., system software, middleware, application software, etc.) configured to perform various VR system operations, such as rendering VR video for display on VR display 210, detecting various VR gestures made using VR controllers, and the like. VR software can reside on (e.g., operations can be performed using) VR display 110, VR controllers 120, some other component(s), or any combination thereof.

In the embodiments illustrated in FIG. 2, VR display 210 includes VR-embedded video application 230. In some embodiments, VR-embedded video application 230 is a stand-alone application. In some cases, VR-embedded video application 230, or a portion thereof, can be additionally or alternatively integrated into the operating system (e.g., as a service) or a server (e.g., a remote server). In some embodiments, VR-embedded video application 230 may be incorporated, or integrated, into an application or an add-on or plug-in to an application (e.g., a VR design application such as VR host application 220). The application (e.g., VR host application 220) may generally be any application capable of facilitating VR design (e.g., 3D design, VR drawing, VR painting, etc.). The application may be a stand-alone application, and could be hosted at least partially server-side. In some cases, the application can be integrated into the operating system (e.g., as a service). One exemplary application that may be used for VR painting is TILT BRUSH®. Although the components of VR-embedded video application 230 are depicted as operating on VR display 210, in some embodiments, any or all of the components can operate on some other communicatively coupled device, such as a local device (e.g., a personal computer (PC), a gaming console, cell phone, etc.), a remote device (e.g., a remote server), and the like.

Generally, VR-embedded video application 230 is an application that modifies the execution of VR host application 220 at runtime in order to overlay one or more VR-embedded widgets on top of the active VR environment of VR host application 220. As such, VR-embedded video application 230 can render VR-embedded widgets directly inside an active VR application environment (e.g., for a VR painting application). Using these VR-embedded widgets, a user can access external content (e.g., VR video tutorials) while interacting with VR host application 220 (e.g., while painting), and can interact with the VR-embedded widgets to explore and learn at the user's own pace. For example, VR-embedded widgets can present external video content and corresponding interfaces directly in a VR painting environment, so a user can simultaneously access video content (e.g., VR video tutorials) and a painting.

In some embodiments, VR-embedded video application 230 can inject the rendering and event system of VR host application 220 into VR-embedded video application 230. For example, after VR host application 220 has rendered its VR environment, but before outputting to VR display 210, injection component 240 can intercept the rendered environment, render one or more VR-embedded widgets on top, and provide this composite rendering for output on VR display 210. Similarly, injection component 240 can intercept VR inputs interacting with the VR-embedded widgets, and pass through VR inputs that do not. In this manner, VR-embedded video application 230 can operate on top of VR host application 220 so that various VR-embedded widgets can be rendered on top of an active VR host application and can be programmed to respond to a user's input in VR. VR-embedded video application 230 may provide any number of VR-embedded widgets, such as video player overlay widget 260, perspective thumbnail overlay widget 270, awareness overlay widget 280, tutorial steps overlay widget 285, and controller overlay widget 290.

Figure 3:
FIG. 3 illustrates an example VR environment in a VR-embedded video retargeting system, in accordance with embodiments of the present invention.

FIG. 3 illustrates an example VR environment in which a VR embedded video application renders VR-embedded widgets on top of a VR host application environment. In FIG. 3, user 310 views VR environment 300 through VR headset 315. VR environment 300 includes VR host application environment 320, as well as a variety of VR-embedded widgets, including video player overlay widget 330, perspective thumbnail overlay widget 340, and awareness overlay widget 350. As explained in more detail below, video player overlay widget 330 presents an external video (e.g., a screencast video of a VR tutorial), perspective thumbnail overlay widget 340 presents a 3D controller simulation scene with virtual controllers corresponding to instructor's controllers in the external video, and awareness overlay widget 350 presents abbreviated information about the video, such as visual information about the progress of the video and/or various events from the video.

Video Player Overlay Widget

In some embodiments, video player overlay widget 330 can be provided (e.g., by video player overlay widget 260 of FIG. 2) to allow a VR user to watch an external video (e.g., screencast video of a VR tutorial) and to interact with an active VR host application, without leaving VR. At a high level, the user can interact with video player overlay widget 330 without pausing the VR host application. Further, video player overlay widget 330 can be shown and controlled within the VR environment of the VR host application. As such, a user will not need to leave the VR host application in order to watch a VR tutorial.

Video player overlay widget 330 can include various interaction elements such as timeline seeking and play/pause buttons. To avoid blocking the user's VR environment, the position and size of video player overlay widget 330 may be configurable. For example, the size of video player overlay widget 330 may be customized by interacting with one or more interaction elements of video player overlay widget 330 (e.g., a button, slider, etc.). Generally, a large UI can provide more detail, but may block the user's field of view in VR. On the other hand, a small UI is less obtrusive, but is less visible. By providing a configurable widget size, each user can select the optimal size for that user's preference. Further, since users may frequently need to start and stop a video (e.g., as a tutorial progresses), in some embodiments, a play/pause shortcut button can be added on the user's controller to reduce muscle fatigue.

Figure 4:
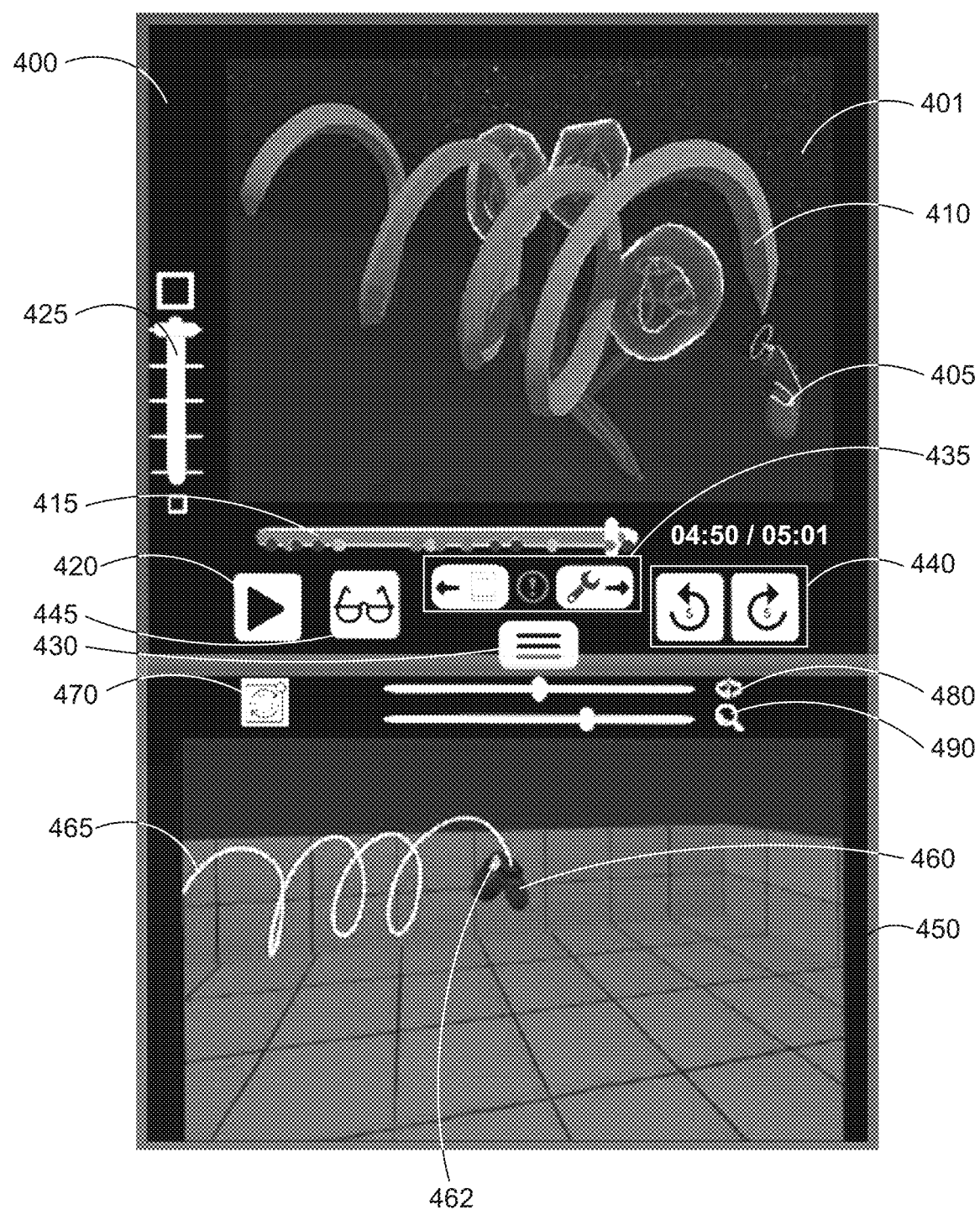
FIG. 4 illustrates an example video player overlay widget and an example perspective thumbnail overlay widget, in accordance with embodiments of the present invention.

FIG. 4 illustrates example video player overlay widget 400. In FIG. 4, video player overlay widget 400 plays screencast video 401. Screencast video 401 depicts instructor controller 405 and 3D drawing 410. Video timeline 415 represents the video's progress and allows a user to navigate the video through interactions with video timeline 415 (e.g., moving the slider) and/or play button 420. In some embodiments, video player overlay widget 400 can include various timeline navigation aids. For example, controlling a timeline video in VR using a touch controller or laser pointer may be slow and tiring. As such, navigation buttons such as seek buttons 440 (e.g., −5 s/+5 s) and/or seek buttons 435 (e.g., jump to prior/next event) may be included. In some embodiments, video player overlay widget 400 is world-fixed. A resizing element such as slider 425 can allow a user to resize video player overlay widget 400, and a reposition element such as button 430 can allow a user to reposition video player overlay widget 400.

In some embodiments, video player overlay widget 400 can include a stereo video mode. Generally, 2D videos, such as 2D screencast videos, do not capture the relative depth between an instructor's controller and virtual objects in a corresponding scene. To enhance depth perception of tutorial content in VR, a stereo mode may be provided. Stereoscopy has been found to be an effective depth cue in VR manipulation tasks. When the stereo mode is activated (e.g., by toggling a button or other element such as button 445), video player overlay widget 400 can present a stereo-captured version of screencast video 401, when available (e.g., when screencast video 401 was recorded in stereo). To playback a stereo video, a graphics shader can be used to separate left and right views from the video image and render them to the viewer's left and right lens, respectively. As a result, the viewer can perceive stereo depth by watching the tutorial video. A blacktape technique may be applied to reduce window violation. In some embodiments, the stereo mode maybe be turned off by default, such that the user may activate stereo mode, for example, only when necessary.

In some embodiments, events from screencast video 401 (e.g., author annotations, automatically detected events, etc.) can be represented on corresponding portions of video timeline 415. For example, different icons (e.g., shapes, colors, textures, etc.) can be used to represent different events (e.g., designated important events/annotated events, tool/mode changes, step transitions, detected events, etc.). The positions of the icons on the timeline may correspond to their relative positions in the video. For example, video timeline 415 includes icons of different shadings positioned along the timeline. The different shadings (or, in other embodiments, different shapes, colors, textures, etc.) can represent different categories of events. Such icons not only provide navigation cues, but also provide temporal awareness of the corresponding events (e.g., events emphasized by the author).

In some embodiments, events from screencast video 401 can be automatically detected. For example, returning to FIG. 2, event detector 250 can automatically detect certain kinds of events from a video and/or corresponding log data. For example, a screencast video tutorial (e.g., a VR painting tutorial) may provide instructions on 3D segments that are difficult to interpret using the screencast video tutorial alone. Thus, in some embodiments, these confusing events from the screencast video can be automatically detected, and the confusing events can be marked on video timeline 415 to help users become more aware of confusing events from the video. More specifically, confusing events may be identified using video analysis, analysis of log data, or some portion thereof. For example, video analysis component 235 and log data analysis component can use an optical flow analysis with designated thresholds to identify confusing events from a video and/or associated log data, respectively. Any number of heuristics for detection may be implemented, including by way of nonlimiting example, spurious HMD motion, ambiguous controller movement in the z direction (i.e., towards/away from the camera), and/or fast or hidden button presses.

Figure 5:
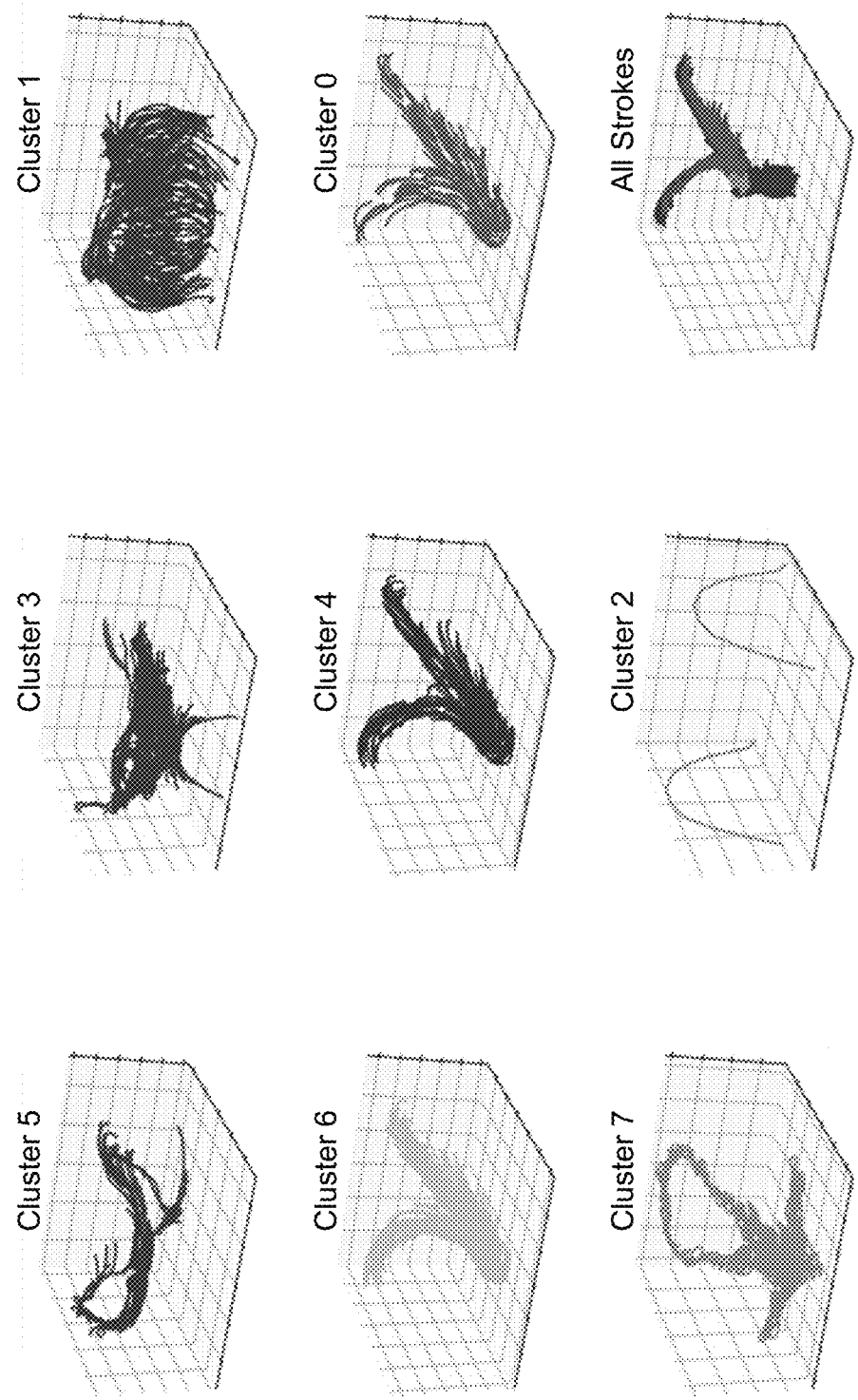
FIG. 5 illustrates example clusters extracted from recorded log data associated with a 3D painting, in accordance with embodiments of the present invention.

Additionally or alternatively, event detector 250 can implement a clustering technique to extract stroke clusters from log data. Generally, the log data can include or otherwise represent a 3D drawing (e.g., a 3D painting), and may include timestamped controller poses (e.g., position and orientation), head-mounted display poses, button presses, and/or traces derived therefrom such as fine-grained brush and color data. Gaps in time and/or space reflected in the log data can be used to infer the beginning of a new tutorial step. As such, the log data can be split into clusters of strokes separated by identified gaps. As such, stroke clusters can provide a proxy for the step structure of a tutorial. FIG. 5 illustrates example clusters extracted from recorded log data associated with the 3D painting illustrated in the video tutorial playing in video player overlay widget 330 of FIG. 3.

Information about these detected tutorial steps can be presented in various ways. For example, timestamps for the beginnings and/or ends of extracted clusters can be identified from the log data. In embodiments where the log data is synchronized with its associated video, the beginnings and/or ends of extracted clusters can be mapped to corresponding events from the video. For example, the beginnings and/or ends of extracted clusters can be used to approximate the beginnings and ends of tutorial steps. These tutorial step events (or a portion thereof, such as the beginnings, or ends) can be represented as icons on the video timeline to facilitate navigating to an event and awareness of the temporal location of the tutorial steps in the video. Additionally or alternatively, in some embodiments, the extracted clusters can be presented as visualizations in a VR-embedded widget (e.g., tutorial steps overlay widget 285 of FIG. 2). For example, when a tutorial step begins or ends in the video, corresponding extracted clusters can be presented in a VR-embedded widget as a visual aid to assist a user to perform the actions depicted in the tutorial step.

Perspective Thumbnail Overlay Widget

In some embodiments, one or more perspective thumbnail overlay widgets can render a 3D controller simulation scene associated with a video tutorial of VR (e.g., a screencast video) and/or a corresponding 3D drawing. The 3D controller simulation scene can illustrate in 3D the actions of, and interactions with, an instructor's controller from a tutorial video in order to help users better understand stroke structure and controller interactions. Log data associated with a 2D video (e.g., including HMD and controller 3D positions and orientations, and controller button press events) can be used to generate and animate a simulation of the instructor's controller and/or corresponding 3D strokes from different perspectives. For example, a perspective thumbnail overlay widget can simulate the movements and interactions of an instructor's controllers from a 2D video into a separate overlay (e.g., adjacent to the video player overlay widget). In this manner, a perspective thumbnail overlay widget translates the actions and interactions of the tutorial author in the video into a designated perspective. FIG. 4 illustrates example perspective thumbnail overlay widget 450. Perspective thumbnail overlay widget 450 presents a 3D controller simulation scene comprising virtual controller 460 and motion trail 465.

Generally, an instructor's controllers can be depicted as virtual controllers in a perspective thumbnail overlay widget. Additionally or alternatively, motion trails representing the movement of the instructor's controllers (and virtual controllers) can be rendered in a perspective thumbnail overlay widget, for example, when a stroke is drawn. Button press events (e.g., button press 462) can be highlighted on the virtual controllers (e.g., in a designated color such as cyan), and virtual controller movement can be emphasized by rendering motion trails (e.g., motion trail 465) in a designated color (e.g., yellow). Designated colors may be selected to provide contrast with the background of the perspective thumbnail overlay widget (e.g., cyan/yellow on black). A perspective thumbnail overlay widget can be transparent to provide visibility of both the video and the host VR application environment.

Generally, a perspective thumbnail overlay widget can simulate the instructor's controller and/or corresponding 3D strokes from any perspective. A perspective thumbnail overlay widget that presents a simulation from the perspective of the viewer is called a user-view overlay widget. Similarly, a perspective thumbnail overlay widget that presents a simulation from the perspective of the instructor is called an instructor-view overlay widget. Generally, a perspective thumbnail overlay widget (whether a user-view overlay widget, an instructor-view overlay widget, or otherwise) may include one or more elements that allow a user to change the perspective for rendering. For example, sliders can facilitate a manual selection of rotation and zoom for further inspection (e.g., rotate slider 480, zoom slider 490, reset view button 470, etc.)

A user-view overlay widget may present a simulation from the perspective of the viewer. As such, a user-view overlay widget can present a simulation that changes perspective based on the user's HMD view direction to convey parallax depth cues. In some embodiments, the user-view overlay widget is world-fixed and/or fixed to the video player overlay widget.

Additionally or alternatively, an instructor-view overlay widget may present a simulation from the perspective of the instructor. Instructions in the form of button presses and 3D gestures are difficult to interpret from 2D video. As such, an instructor view overlay widget can re-render and highlight these instructions within a simulated 3D scene, and map this rendering to the instructor view overlay widget, so the user can quickly understand how to perform a particular action in VR from her own perspective. In some embodiments, the instructor view overlay widget is view-fixed to provide a convenient, fixed point of reference representing a VR tutorial from the instructor's point of view.

Separate widgets rendering from different perspectives can provide various benefits. For example, by providing an instructor-view overlay widget in a view-fixed manner, and providing a user-view overlay widget in a world-fixed manner, the instructor's perspective can be emphasized to the user. More specifically, if a user is trying to replicate a particular action depicted in a video, it is easier for the user to replicate the instructor's perspective when the instructor-view overlay widget is view-fixed. Similarly, the instructor view overlay widget may be preferred by users who want more of a guided experience, as opposed to the user-view overlay widget, which can be preferred by more advanced users.

In some embodiments, a perspective thumbnail overlay widget can be rendered in stereo (e.g., based on a user-toggled stereo mode) to convey depth perception. For example, a controller simulation scene can be rendered using a custom stereo camera rig and outputting left/right textures to the corresponding rendering eye target in the viewer's VR system. In some embodiments, walls and grid lines can be included in a simulated scene to provide pictorial and perspective depth cues, which can help users more quickly interpret the motion of the virtual controllers. In some embodiments, the field-of-view of the stereo camera rig can be increased in order to increase the visibility of the controllers. As such, a viewer can observe the instructor's controller actions as if the viewer is looking over the shoulder of the instructor.

In some embodiments, a perspective thumbnail overlay widget is always displayed as an overlay in the host VR application environment. In some embodiments, a perspective thumbnail overlay widget is initially not displayed, and as a user scrubs the timeline of the video player overlay widget, a separate perspective thumbnail overlay widget window can appear that includes a rendering of 3D strokes from the video up to the point in time designated by the timeline.

To increase the effectiveness of the simulated visualizations, in some embodiments, the highlights of button presses and the stroke trail may be gradually faded over a designated time (e.g., 5 seconds), whether fixed, configurable, or otherwise. By gradually fading the simulated visualizations, users may be provided with enough time to discover and understand ephemeral actions. This technique reduces and/or avoids the need to perform a frame-by-frame search to identify crucial information from a VR tutorial.

Figure 6B:
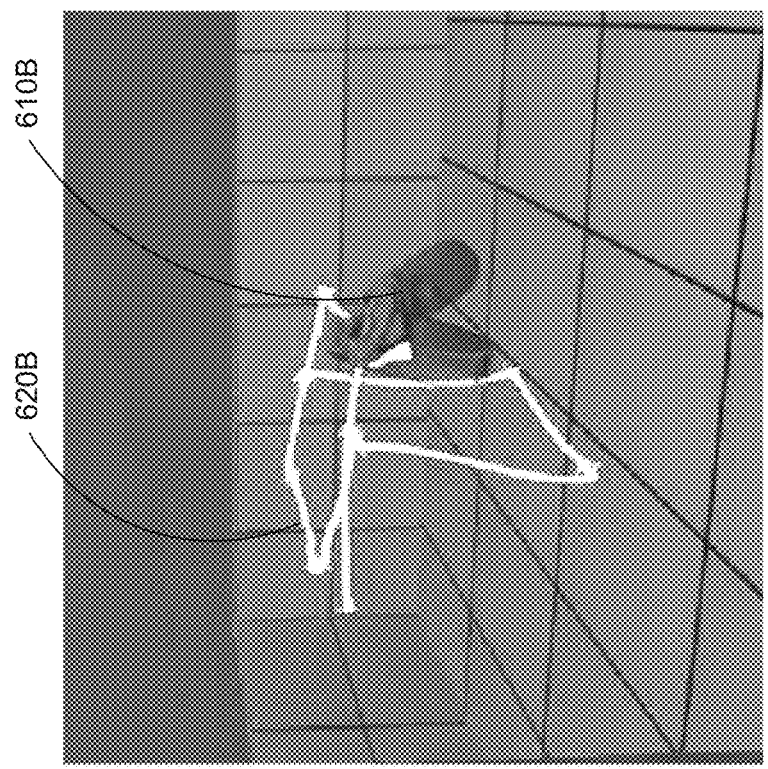
FIG. 6B illustrates a corresponding example perspective thumbnail overlay widget, in accordance with embodiments of the present invention.
Figure 6A:
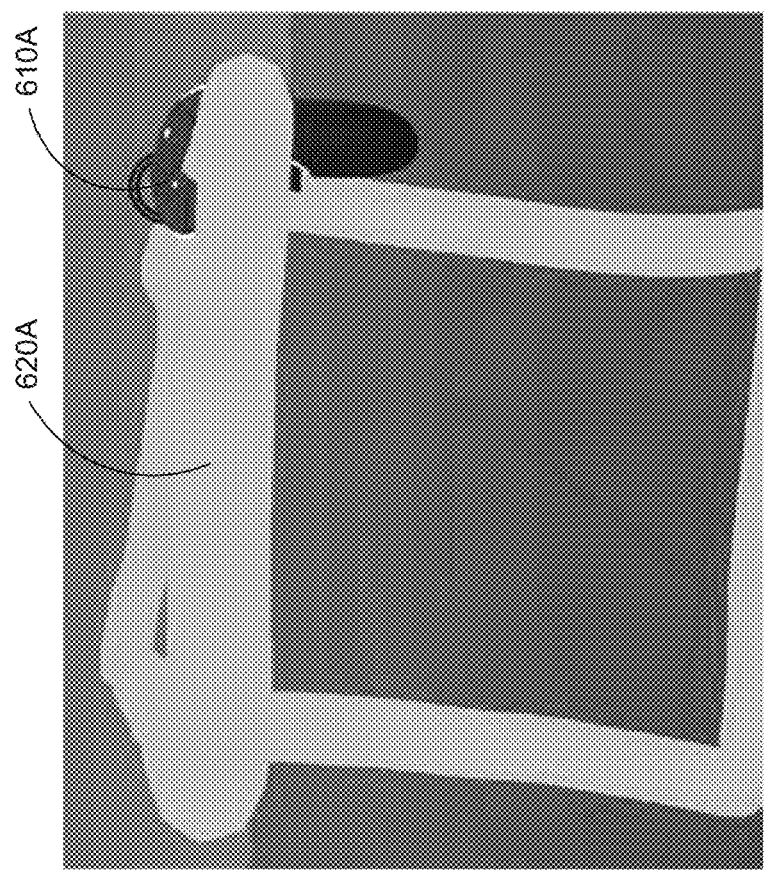
FIG. 6A illustrates an example 2D screencast video.

FIG. 6A illustrates an example 2D screencast video, and FIG. 6B illustrates a corresponding example perspective thumbnail overlay widget. In FIG. 6A, instructor controller 610A is shown generating 3D drawing 620A. However, due to the angle of the camera and the relative positions of instructor controller 610A and 3D drawing 620A, 3D drawing 620A is occluded and difficult to interpret. In FIG. 6B, corresponding virtual controller 610B draws corresponding 3D drawing 620B from a different perspective. In the perspective thumbnail overlay widget illustrated in FIG. 6B, the drawing is more easily interpretable.

In some embodiments, a perspective thumbnail overlay widget can facilitate a video navigation technique in which a user can reach into the 3D controller simulation scene and brush over a 3D drawing or painting (or a portion of a 3D drawing or painting corresponding to visible motion trails) in the scene to quickly search for relevant video segments showing how to draw or paint that region. Generally, the perspective thumbnail overlay widget can be thought of as providing a thumbnail of a corresponding video. In some embodiments, a user can reach into the thumbnail in the perspective thumbnail overlay widget (e.g., using a laser pointer) and brush over a 3D painting depicted in the thumbnail to trigger a search (e.g., by 3D video navigation component 273 of FIG. 3) for corresponding video segments involving that region. More specifically, since the 3D controller simulation scene can be generated from log data, and the log data can be synchronized with the video, by identifying a portion of a 3D stroke in the 3D controller simulation scene, a mapping can be generated between the selected portion of the 3D stroke and a corresponding portion of the video. As such, upon selecting a portion of a 3D stroke in the 3D controller simulation scene, the video player overlay widget can jump to a corresponding portion of the video.

In some embodiments, a feedback mode can be toggled that allows users to practice complicated 3D strokes. Feedback mode may, but need not, be toggled by an interaction element associated with a perspective thumbnail overlay widget. In some embodiments, feedback mode may be turned on or turned off by default, and may be toggled by an interaction element associated with any VR-embedded widget. In some embodiments, feedback mode is associated with an instructor-view overlay widget.

When feedback mode is enabled, a particular instructor stroke can be designated as a goal stroke (e.g., one or more user-selected instructor strokes, one or more instructor strokes associated with a current position of a video being played back, etc.). The user may then practice the designated goal stroke, and a difference between the instructor-generated stroke (from log data) and the user-generated stroke can be determined (e.g., by feedback mode component 275 of FIG. 2). Any suitable difference function may be used, and the difference may take the form of a scaler or vector, whether time-dependent, space-dependent, both, or otherwise. A visualization indicating the difference may be presented in an associated VR-embedded widget (e.g., an instructor-view overlay widget). The visualization can take various forms, such as a numerical score, a 3D visualization of a spatial distribution of the difference function, and the like. An interaction element may allow the user to automatically loop or manually repeat playback to allow users to practice creating strokes in the style of the video instructor. Thus, feedback mode can illustrate how close the user-generated stroke appears to the instructor-generated stroke.

Awareness Overlay Widget

Generally, VR environments are much larger than those available using 2D interfaces (e.g., on conventional desktops). As such, it is very easy for users to lose track of a world-fixed video player overlay widget in their field of view, so they may miss important information from a video while the video is playing. In the context of VR tutorials, viewers can miss important instructions, especially when the instructions are not explicitly voiced out. For example, when a user is too focused on a VR painting, she might fail to notice an important action performed by the instructor in a video. In some embodiments, the user may choose to position the video player overlay widget close to the painting, but then it may obstruct her workflow.

To address this problem, in some embodiments, an awareness overlay widget (such as awareness overlay widget 350 in FIG. 3) may be provided as an extension of the video player overlay widget. While the video player overlay widget may be world-fixed, the awareness overlay widget may be rendered view-fixed, optionally becoming visible only when the video player overlay widget is not visible in the user's field of view. In this sense, when a user looks away from a video playing in the video player overlay widget, an awareness overlay widget can appear. Similarly, when the user looks back to the video player overlay widget, the awareness overlay widget can disappear. The awareness overlay widget may provide the user with abbreviated information about the video, such as visual information about the progress of the video and/or various events from the video (e.g., designated important events, tool/mode changes, step transitions, detected events, etc.). In some embodiments, the awareness overlay widget is at least in part transparent, and/or the user can customize its position (e.g., vertical position and/or horizontal position) so that the awareness overlay widget does not obstruct their active field of view.

Figure 7:
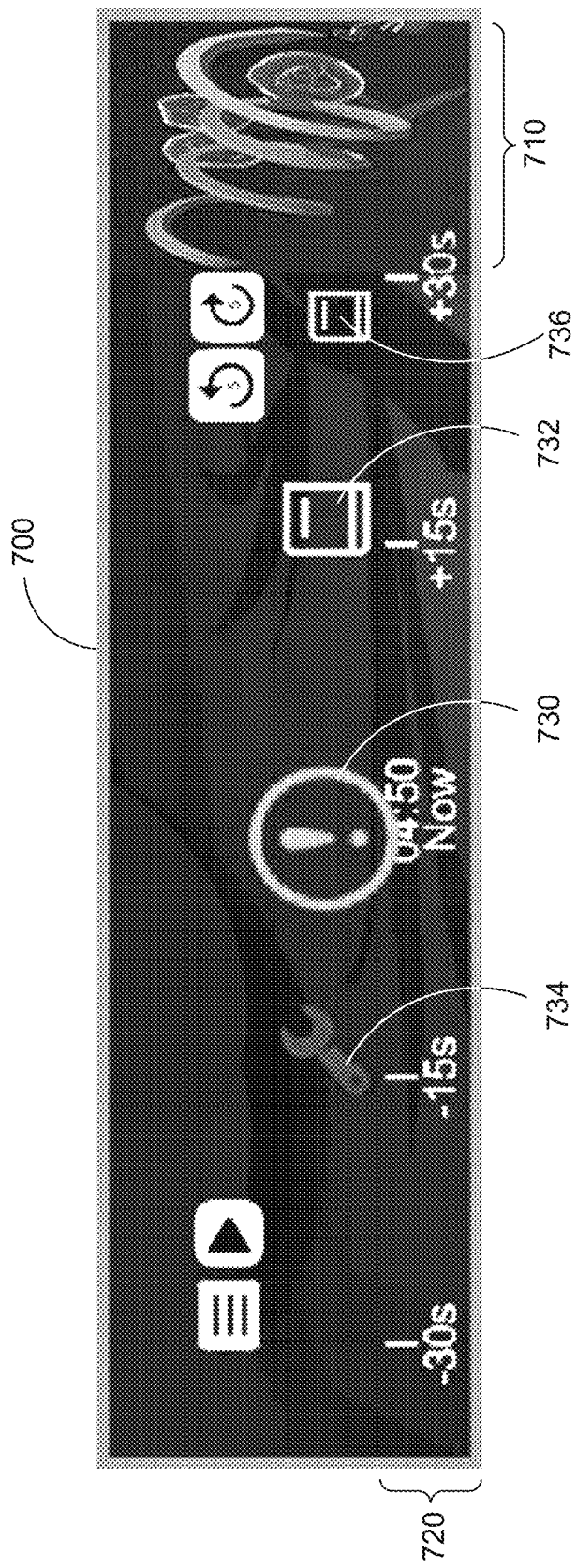
FIG. 7 illustrates an example awareness overlay widget, in accordance with embodiments of the present invention.

FIG. 7 illustrates example awareness overlay widget 700. In some embodiments, awareness overlay widget 700 provides visual information about a video such as a screencast video tutorial. Such visual information may include video thumbnail 710, current video time, and/or icons representing events (e.g., icons 730, 732, 734, and 736) and their temporal location on a video timeline (e.g., video timeline 720). Different icons (e.g., shapes, colors, textures, etc.) can be used to represent different events (e.g., designated important events/annotated events, tool/mode changes, step transitions, detected events, etc.). In the embodiment illustrated in FIG. 7, wrench icon 734 represents a tool change event, critical event icon 730 designates an author-annotated important event, and step change icons 732 and 736 designate the beginnings of detected tutorial steps. Shapes, colors, textures, or other characteristics may be shared between icons presented on the video player overlay widget and the awareness overlay widget.

In some embodiments, the video timeline may include an abbreviated time window (e.g., +30 s/−30 s). As the video plays, the positions of the icons can advance along the timeline. As with the video player overlay widget, the size of the icons presented on the awareness overlay widget may increase temporarily as the corresponding event approaches the current video time to aid in attracting user attention. Moreover and also as with the video player overlay widget, in some embodiments, a user may quickly navigate to an event by clicking on its icons in the awareness overlay widget. In some embodiments, the awareness overlay widget may present other information that might be useful for a viewer of a screencast video tutorial, such as the video transcript, tool reminders, or the viewer's progress in the tutorial.

In some embodiments, a VR-embedded overlay widget may be presented attached above the user's controller. This controller overlay widget can be used to display tool tips, or other information about a selected and/or active VR-embedded overlay widget.

The foregoing VR-embedded overlay widgets are meant merely as examples. Any suitable VR-embedded overlay widget, whether video-related or otherwise, may be implemented within the scope of the present disclosure.

Exemplary Flow Diagrams

Figure 8:
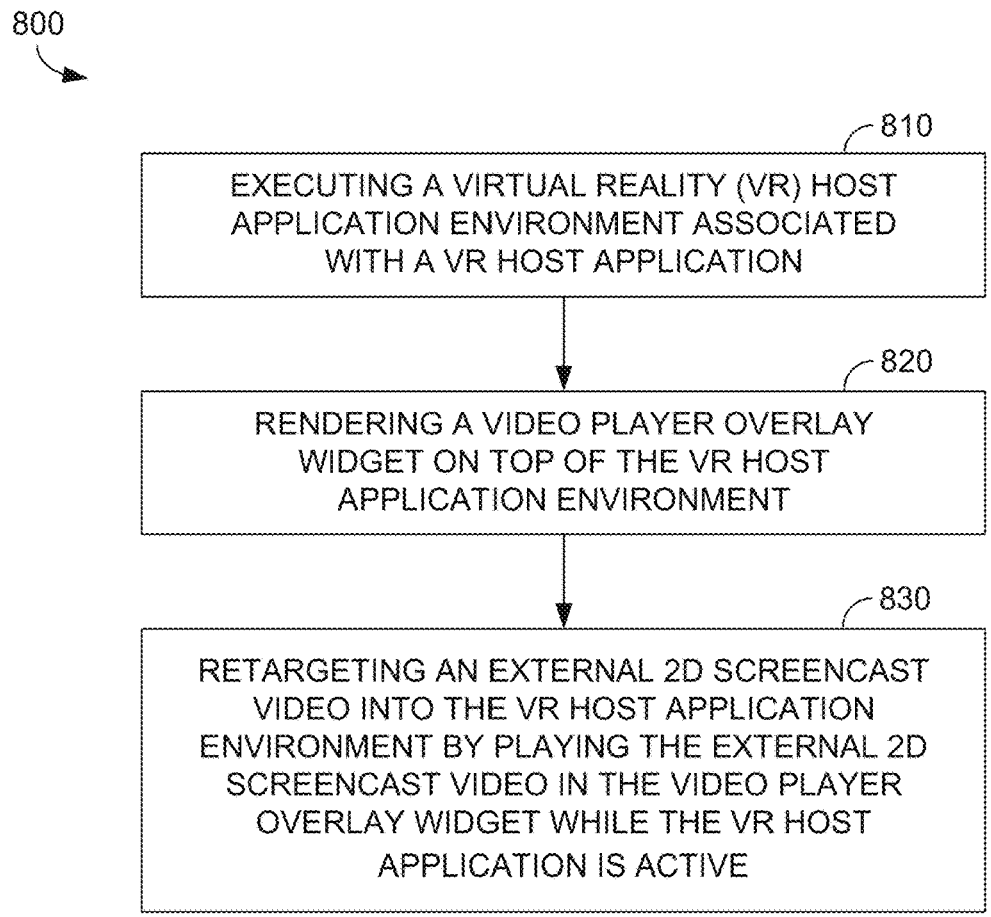
FIG. 8 is a flow diagram showing a method for retargeting an external 2D screencast video into a VR host application environment, in accordance with embodiments of the present invention.
Figure 9:
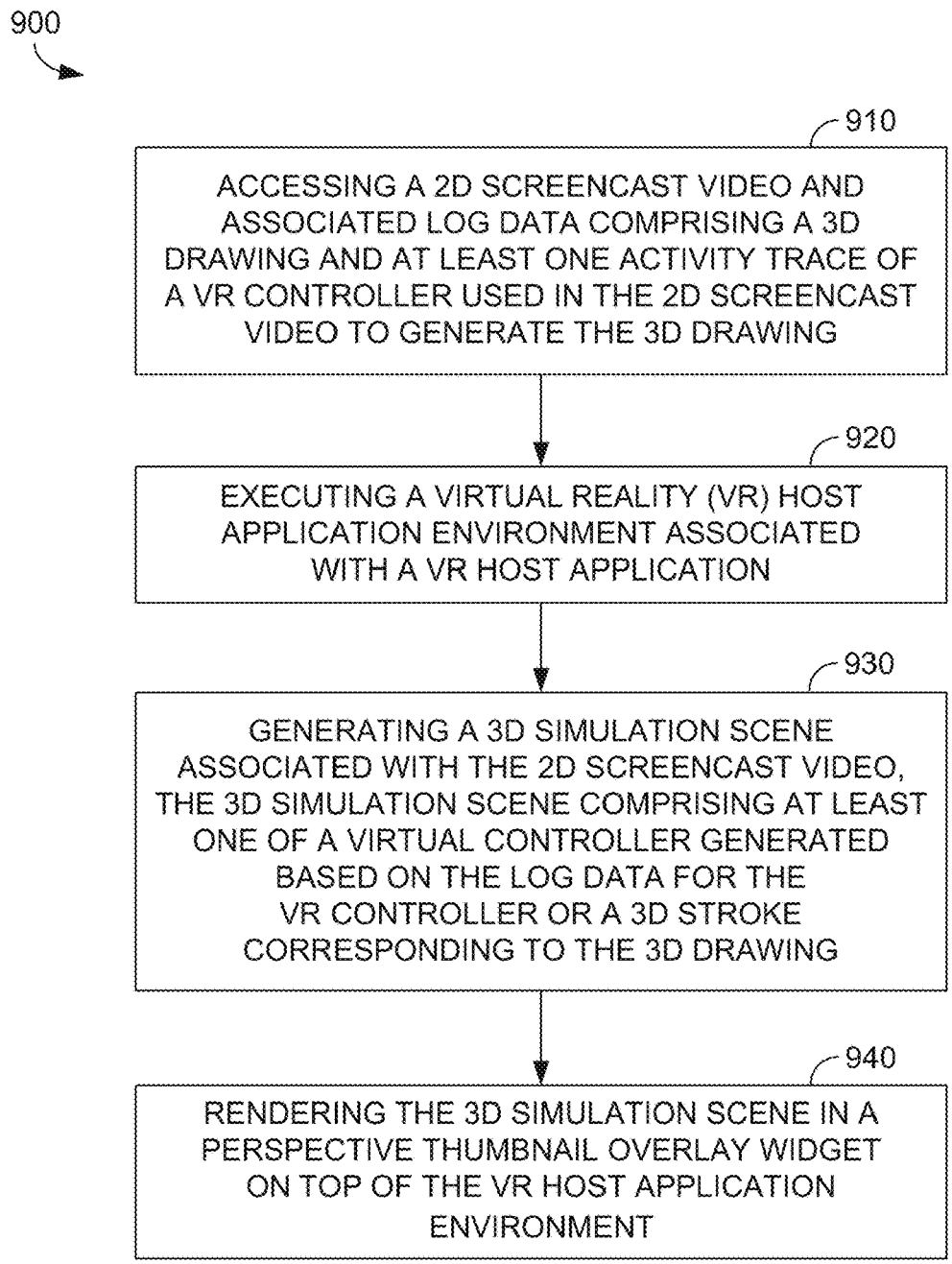
FIG. 9 is a flow diagram showing a method for rendering a 3D simulation scene, in accordance with embodiments of the present invention.

With reference now to FIGS. 8-9, flow diagrams are provided illustrating methods for retargeting an external 2D screencast video and/or for rendering a 3D simulation scene. Each block of the methods 800 and 900 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 8, FIG. 8 illustrates a method 800 for retargeting an external 2D screencast video into a VR host application environment, in accordance with embodiments described herein. Initially at block 810, a virtual reality (VR) host application environment associated with a VR host application is executed. At block 820, a video player overlay widget is rendered on top of the VR host application environment. At block 830, an external 2D screencast video is retargeted into the VR host application environment by playing the external 2D screencast video in the video player overlay widget while the VR host application is active.

Turning now to FIG. 9, FIG. 9 illustrates a method 900 for rendering a 3D simulation scene, in accordance with embodiments described herein. Initially at block 910, a 2D screencast video and associated log data comprising a 3D drawing and at least one activity trace of a VR controller used in the 2D screencast video to generate the 3D drawing are accessed. At block 920, a virtual reality (VR) host application environment associated with a VR host application is executed. At block 930, a 3D simulation scene associated with the 2D screencast video is generated. The 3D simulation scene comprises at least one of a virtual controller generated based on the log data for the VR controller or a 3D stroke corresponding to the 3D drawing. At block 940, the 3D simulation scene is rendered in a perspective thumbnail overlay widget on top of the VR host application environment.

Exemplary Computing Environment

Figure 10:
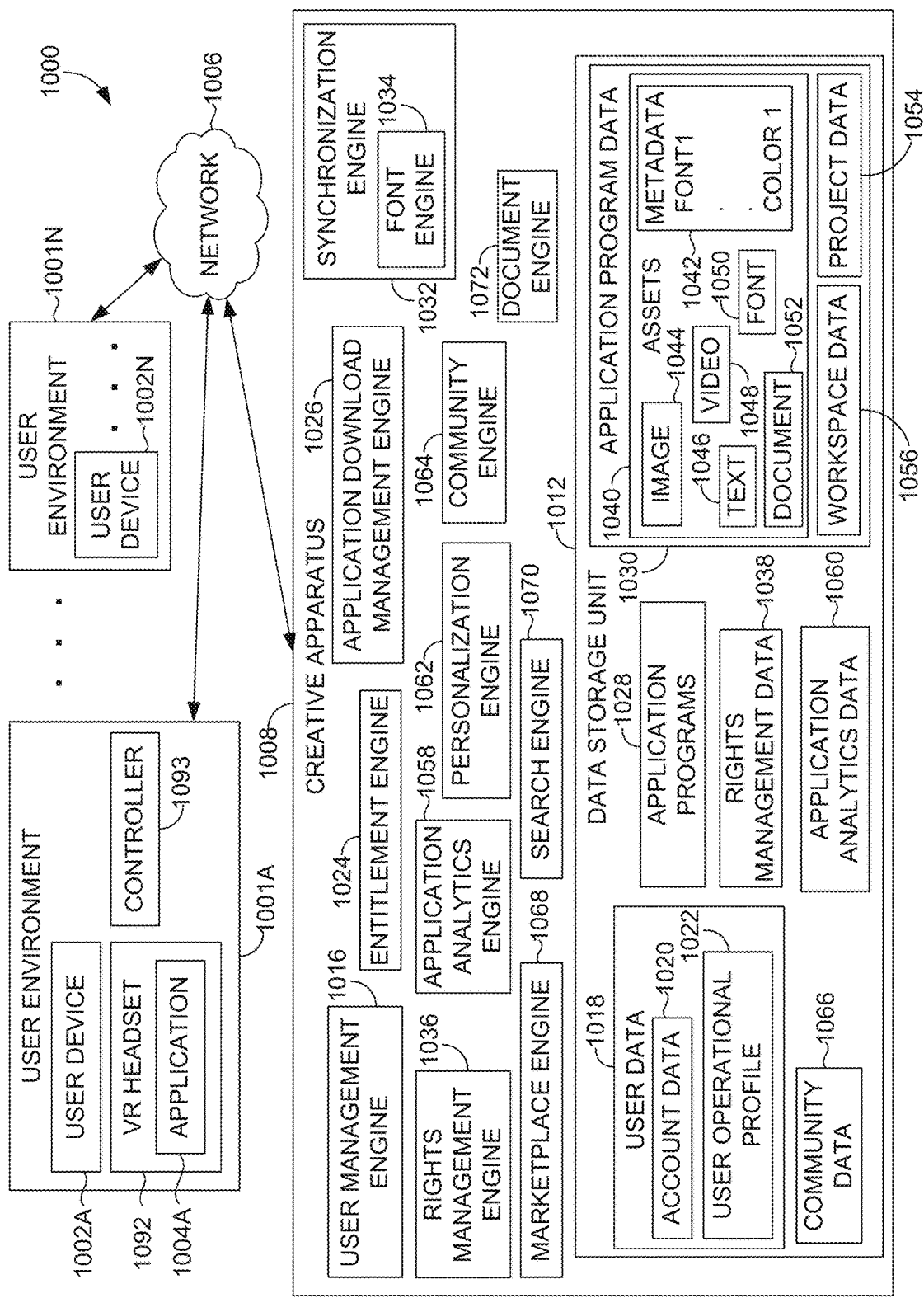
FIG. 10 is a block diagram of an exemplary computing environment in which embodiments of the invention may be employed.

FIG. 10 is a diagram of environment 1000 in which one or more embodiments of the present disclosure can be practiced. Environment 1000 includes one or more user devices, such as user devices 1002A-1002N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 1008. It is to be appreciated that following description may generally refer to user device 1002A as an example and any other user device can be used.

A user of the user device can utilize various products, applications, or services supported by creative apparatus 1008 via network 1006. User devices 1002A-1002N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 1008.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 1002A-1002N can be connected to creative apparatus 1008 via network 1006. Examples of network 1006 include, but are not limited to, internet, local area network (LAN), wireless area network, wired area network, wide area network, and the like.

Creative apparatus 1008 includes one or more engines for providing one or more digital experiences to the user. Creative apparatus 1008 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 1008 also includes data storage unit 1012. Data storage unit 1012 can be implemented as one or more databases or one or more data servers. Data storage unit 1012 includes data that is used by the engines of creative apparatus 1008.

A user of user device 1002A visits a webpage or an application store to explore applications supported by creative apparatus 1008. Creative apparatus 1008 provides the applications as a software as a service (SaaS), or as a standalone application that can be installed on user device 1002A, or as a combination. The user can create an account with creative apparatus 1008 by providing user details and also by creating login details. Alternatively, creative apparatus 1008 can automatically create login details for the user in response to receipt of the user details. In some embodiments, the user is also prompted to install an application manager. The application manager enables the user to manage installation of various applications supported by creative apparatus 1008 and also to manage other functionalities, such as updates, subscription account and the like, associated with the applications. User details are received by user management engine 1016 and stored as user data 1018 in data storage unit 1012. In some embodiments, user data 1018 further includes account data 1020 under which the user details are stored.

The user can either opt for a trial account or can make payment based on type of account or subscription chosen by the user. Alternatively, the payment can be based on product or number of products chosen by the user. Based on payment details of the user, user operational profile 1022 is generated by entitlement engine 1024. User operational profile 1022 is stored in data storage unit 1012 and indicates entitlement of the user to various products or services. User operational profile 1022 also indicates type of user, i.e. free, trial, student, discounted, or paid.

In some embodiment, user management engine 1016 and entitlement engine 1024 can be one single engine performing the functionalities of both the engines.

The user can then install various applications supported by creative apparatus 1008 via an application download management engine 1026. Application installers or application programs 1028 present in data storage unit 1012 are fetched by application download management engine 1026 and made available to the user directly or via the application manager. In one embodiment, an indication of all application programs 1028 are fetched and provided to the user via an interface of the application manager. In another embodiment, an indication of application programs 1028 for which the user is eligible based on user's operational profile are displayed to the user. The user then selects application programs 1028 or the applications that the user wants to download. Application programs 1028 are then downloaded on user device 1002A by the application manager via the application download management engine 1026. Corresponding data regarding the download is also updated in user operational profile 1022. Application program 1028 is an example of the digital tool. Application download management engine 1026 also manages the process of providing updates to user device 1002A.

Upon download, installation and launching of an application program, in one embodiment, the user is asked to provide the login details. A check is again made by user management engine 1016 and entitlement engine 1024 to ensure that the user is entitled to use the application program. In another embodiment, direct access is provided to the application program as the user is already logged into the application manager.

The user uses one or more application programs 1004A-1004N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 1030 in data storage unit 1012 by synchronization engine 1032. Alternatively or additionally, such data can be stored at the user device, such as user device 1002A.

Application program data 1030 includes one or more assets 1040. Assets 1040 can be a shared asset which the user wants to share with other users or which the user wants to offer on a marketplace. Assets 1040 can also be shared across multiple application programs 1028. Each asset includes metadata 1042. Examples of metadata 1042 include, but are not limited to, font, color, size, shape, coordinate, a combination of any of these, and the like. In addition, in one embodiment, each asset also includes a file. Examples of the file include, but are not limited to, image 1044, text 1046, video 1048, font 1050, document 1052, a combination of any of these, and the like. In another embodiment, an asset only includes metadata 1042.

Application program data 1030 also include project data 1054 and workspace data 1056. In one embodiment, project data 1054 includes assets 1040. In another embodiment, assets 1040 are standalone assets. Similarly, workspace data 1056 can be part of project data 1054 in one embodiment while it may be standalone data in other embodiment.

A user can operate one or more user device to access data. In this regard, application program data 1030 is accessible by a user from any device, including a device which was not used to create assets 1040. This is achieved by synchronization engine 1032 that stores application program data 1030 in data storage unit 1012 and enables application program data 1030 to be available for access by the user or other users via any device. Before accessing application program data 1030 by the user from any other device or by any other user, the user or the other user may need to provide login details for authentication if not already logged in. In some cases, if the user or the other user are logged in, then a newly created asset or updates to application program data 1030 are provided in real time. Rights management engine 1036 is also called to determine whether the newly created asset or the updates can be provided to the other user or not. Workspace data 1056 enables synchronization engine 1032 to provide a same workspace configuration to the user on any other device or to the other user based on rights management data 1038.

In various embodiments, various types of synchronization can be achieved. For example, the user can pick a font or a color from user device 1002A using a first application program and can use the font or the color in a second application program on any other device. If the user shares the font or the color with other users, then the other users can also use the font or the color. Such synchronization generally happens in real time. Similarly, synchronization of any type of application program data 1030 can be performed.

In some embodiments, user interaction with applications 1004 is tracked by application analytics engine 1058 and stored as application analytics data 1060. Application analytics data 1060 includes, for example, usage of a tool, usage of a feature, usage of a workflow, usage of assets 1040, and the like. Application analytics data 1060 can include the usage data on a per user basis and can also include the usage data on a per tool basis or per feature basis or per workflow basis or any other basis. Application analytics engine 1058 embeds a piece of code in applications 1004 that enables the application to collect the usage data and send it to application analytics engine 1058. Application analytics engine 1058 stores the usage data as application analytics data 1060 and processes application analytics data 1060 to draw meaningful output. For example, application analytics engine 1058 can draw an output that the user uses "Tool 4" a maximum number of times. The output of application analytics engine 1058 is used by personalization engine 1062 to personalize a tool menu for the user to show "Tool 4" on top. Other types of personalization can also be performed based on application analytics data 560. In addition, personalization engine 1062 can also use workspace data 1056 or user data 1018 including user preferences to personalize one or more application programs 1028 for the user.

In some embodiments, application analytics data 1060 includes data indicating status of a project of the user. For example, if the user was preparing an article in a digital publishing application and what was left was publishing the prepared article at the time the user quit the digital publishing application, then application analytics engine 1058 tracks the state. Now when the user next opens the digital publishing application on another device, then the user is indicated and the state and options are provided to the user for publishing using the digital publishing application or any other application. In addition, while preparing the article, a recommendation can also be made by synchronization engine 1032 to incorporate some of other assets saved by the user and relevant for the article. Such a recommendation can be generated using one or more engines, as described herein.

Creative apparatus 1008 also includes community engine 1064 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 1030. Community engine 1064 stores any data corresponding to the community, such as work shared on the community and comments or likes received for the work as community data 1066. Community data 1066 also includes notification data and is used for notifying other users by the community engine in case of any activity related to the work or new work being shared. Community engine 1064 works in conjunction with synchronization engine 1032 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 1064 and synchronization engine 1032. In collaborative workflows, a plurality of users is assigned different tasks related to the work.

Creative apparatus 1008 also includes marketplace engine 1068 for providing marketplace to one or more users. Marketplace engine 1068 enables the user to offer an asset for selling or using. Marketplace engine 1068 has access to assets 1040 that the user wants to offer on the marketplace. Creative apparatus 1008 also includes search engine 1070 to enable searching of assets 1040 in the marketplace. Search engine 1070 is also a part of one or more application programs 1028 to enable the user to perform search for assets 1040 or any other type of application program data 1030. Search engine 1070 can perform a search for an asset using metadata 1042 or the file.

Creative apparatus 1008 also includes document engine 1072 for providing various document related workflows, including electronic or digital signature workflows, to the user. Document engine 1072 can store documents as assets 1040 in data storage unit 1012 or can maintain a separate document repository (not shown in FIG. 10).

In accordance with embodiments of the present invention, application programs 1028 include VR-embedded video application configured to overlay VR-embedded widgets on top of an active VR environment. In these embodiments, the VR-embedded video application is provided to VR headset 1092 and/or a communicatively coupled user device 1002A (e.g., as application 1004A) such that the VR-embedded video application operates via VR headset 1092 using inputs from controller 693. In another embodiment, similar functionality can be provided as an add-on or plug-in to a VR host application. These configurations are merely exemplary, and other variations for providing VR-embedded widgets are contemplated within the present disclosure.

It is to be appreciated that the engines and working of the engines are described as examples herein, and the engines can be used for performing any step in providing digital experience to the user.

Exemplary Operating Environment

Figure 11:
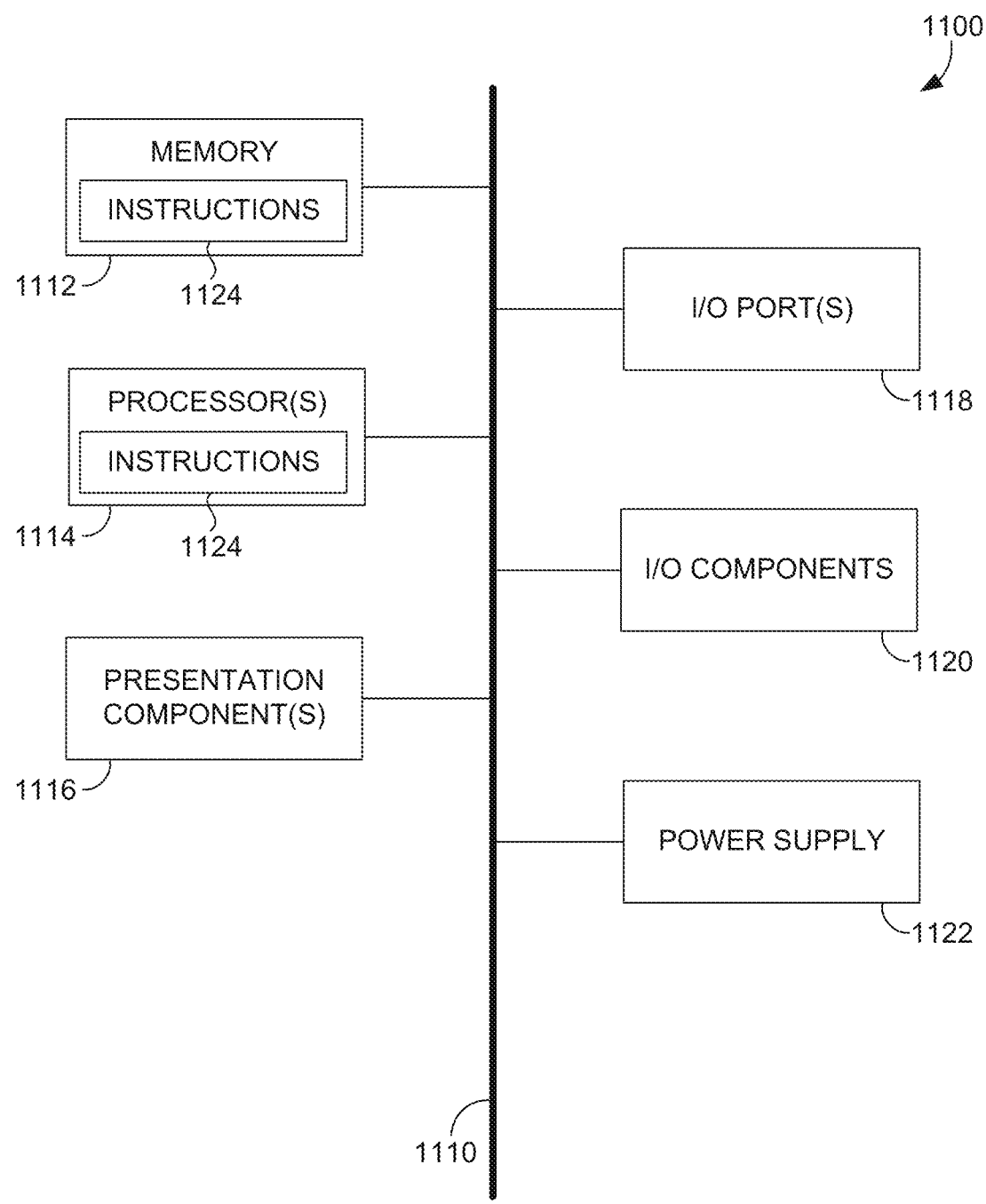
FIG. 11 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 614, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1100. Computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of computing device 1100 to render immersive augmented reality or virtual reality.

Embodiments described herein support retargeting an external 2D screencast video into a VR host application environment. The components described herein refer to integrated components of a VR-embedded video retargeting system. The integrated components refer to the hardware architecture and software framework that support functionality using the VR-embedded video retargeting system. The hardware architecture refers to physical components and interrelationships thereof and the software framework refers to software providing functionality that can be implemented with hardware embodied on a device.

The end-to-end software-based VR-embedded video retargeting system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method comprising:
   intercepting, by a virtual reality (VR)-embedded video application, a rendered three-dimensional (3D) environment transmitted by a VR design application to a VR display before the VR display receives the rendered 3D environment;
   rendering, by the VR-embedded video application, a composite 3D environment by rendering a VR-embedded widget on top of the rendered 3D environment;
   outputting, by the VR-embedded video application, the composite 3D environment to the VR display;
   evaluating, by the VR-embedded video application, VR inputs transmitted to the VR design application before the VR design application receives the VR inputs;
   intercepting, by the VR-embedded video application, a first set of the VR inputs that interact with the VR-embedded widget in the composite 3D environment; and
   determining, by the VR-embedded video application, not to intercept a second set of the VR inputs that do not interact with the VR-embedded widget in the composite 3D environment,
   wherein the VR-embedded widget is configured to present at least one of an external two-dimensional (2D) screencast video or a three-dimensional (3D) simulation scene associated with the external 2D screencast video.

2. The method of claim 1, wherein the VR-embedded widget is configured to render the external 2D screencast video stereoscopically.

3. The method of claim 1, the method further comprising rendering, based on a determination that the VR-embedded widget is not visible in a field of view, a view-fixed awareness overlay widget configured to present visual information about the external 2D screencast video.

4. The method of claim 3, wherein the view-fixed awareness overlay widget includes a video timeline with icons representing events of the external 2D screencast video, wherein the icons are configured to temporarily increase size as corresponding events approach.

5. The method of claim 1, the method further comprising automatically detecting events in the external 2D screencast video by analyzing at least one of the external 2D screencast video or corresponding log data.

6. The method of claim 5, wherein the VR-embedded widget includes a video timeline with icons representing the detected events.

7. The method of claim 1, wherein the external 2D screencast video comprises a live stream of an instructor retargeted in real-time, and wherein the VR-embedded widget is configured to act as a communication bridge.

8. A system comprising:
   one or more hardware processors and memory configured to provide computer program instructions to the one or more hardware processors; and
   a means for rendering a VR-embedded widget on top of a rendered three-dimensional (3D) environment of an active VR host application by using the one or more hardware processors to:
      evaluate VR inputs transmitted to the active VR host application before the active VR host application receives the VR inputs;
      intercept a first set of the VR inputs that interact with the VR-embedded widget in the composite 3D environment; and
      determine not to intercept a second set of the VR inputs that do not interact with the VR-embedded widget in the composite 3D environment,
   wherein the VR-embedded widget is configured to present at least one of an external two-dimensional (2D) screencast video or a three-dimensional (3D) simulation scene associated with the external 2D screencast video.

9. The system of claim 8, wherein the VR host application comprises a rendering and event system, and wherein the system additionally comprises an injection component configured to inject the rendering and event system of the VR host application into code for the VR-embedded widget.

10. The system of claim 8, additionally comprising an event detector configured to automatically detect events in the external 2D screencast video by analyzing at least one of the external 2D screencast video or corresponding log data.

11. The system of claim 10, wherein the VR-embedded widget is configured to represent the detected events as icons on a video timeline.

12. A system comprising:
   one or more hardware processors and memory configured to provide computer program instructions to the one or more hardware processors;
   an injection component, of a virtual reality (VR)-embedded video application, configured to use the one or more hardware processors to:
      intercept a rendered three-dimensional (3D) environment transmitted by a VR design application to a VR display before the VR display receives the rendered 3D environment;
      render a composite 3D environment by rendering a VR-embedded widget on top of the rendered 3D environment;
      evaluate VR inputs transmitted to the VR design application before the VR design application receives the VR inputs;

intercept a first set of the VR inputs that interact with the VR-embedded widget in the composite 3D environment and pass the first set of VR inputs to the VR-embedded widget;

determine not to intercept a second set of the VR inputs into the VR design application that do not interact with the VR-embedded widget in the composite 3D environment; and output the composite 3D environment to the VR display, wherein the VR-embedded widget is configured to present at least one of an external two-dimensional (2D) screencast video or a three-dimensional (3D) simulation scene associated with the external 2D screencast video.

13. The system of claim 12, wherein the VR-embedded widget is configured to render the external 2D screencast video stereoscopically.

14. The system of claim 12, the VR-embedded video application further configured to render, based on a determination that the VR-embedded widget is not visible in a field of view, a view-fixed awareness overlay widget configured to present visual information about the external 2D screencast video.

15. The system of claim 14, wherein the view-fixed awareness overlay widget includes a video timeline with icons representing events of the external 2D screencast video, wherein the icons are configured to temporarily increase size as corresponding events approach.

16. The system of claim 12, the VR-embedded video application further configured to automatically detect events in the external 2D screencast video by analyzing at least one of the external 2D screencast video or corresponding log data.

17. The system of claim 16, wherein the VR-embedded widget includes a video timeline with icons representing the detected events.

18. The system of claim 12, wherein the external 2D screencast video comprises a live stream of an instructor retargeted in real-time, and wherein the VR-embedded widget is configured to act as a communication bridge.

* * * * *